(12) United States Patent
Fukushima et al.

(10) Patent No.: US 11,097,520 B2
(45) Date of Patent: Aug. 24, 2021

(54) LAMINATE, METHOD OF MANUFACTURING LAMINATE, AND METHOD OF MANUFACTURING ANTIREFLECTION FILM

(71) Applicant: FUJIFILM Corporation, Tokyo (JP)

(72) Inventors: Yuta Fukushima, Kanagawa (JP); Shuntaro Ibuki, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 80 days.

(21) Appl. No.: 16/564,569

(22) Filed: Sep. 9, 2019

(65) Prior Publication Data

US 2019/0391296 A1   Dec. 26, 2019

Related U.S. Application Data

(63) Continuation of application No. PCT/JP2018/005874, filed on Feb. 20, 2018.

(30) Foreign Application Priority Data

Mar. 31, 2017 (JP) .............................. JP2017-072558

(51) Int. Cl.
*B32B 27/20* (2006.01)
*B32B 7/12* (2006.01)
(Continued)

(52) U.S. Cl.
CPC .............. *B32B 27/20* (2013.01); *B29C 65/48* (2013.01); *B29C 65/4825* (2013.01); *B32B 7/12* (2013.01);
(Continued)

(58) Field of Classification Search
CPC .. B32B 7/06; B32B 7/12; B32B 27/20; B32B 2264/101; B32B 2264/301; B29C 41/22;
(Continued)

(56) References Cited

U.S. PATENT DOCUMENTS

2016/0061997 A1* 3/2016 Kamohara ............. G02B 1/118
428/323
2018/0141245 A1   5/2018 Wakizaka et al.

FOREIGN PATENT DOCUMENTS

JP          07-104103 A      4/1995
JP          11-271506 A     10/1999
(Continued)

OTHER PUBLICATIONS

Office Action, issued by the Japanese Patent Office dated Apr. 21, 2020, in connection with Japanese Patent Application No. 2019-508760.
(Continued)

*Primary Examiner* — Michael A Tolin
*Assistant Examiner* — Brian R Slawski
(74) *Attorney, Agent, or Firm* — Edwards Neils LLC; Jean C. Edwards, Esq.

(57) ABSTRACT

A laminate includes a support, a layer (b) including a pressure sensitive adhesive, particles (a2) having an average primary particle diameter of 100 nm to 380 nm, and a layer (ca) including a resin, in which the layer (b) is provided closer to the support than the layer (ca), the particles (a2) are buried in a layer obtained by combining the layer (b) and the layer (ca) and protrudes from an interface of the layer (ca) on the support side, and a portion including the particles (a2) and the layer (ca) is peelable from the layer (b).

5 Claims, 2 Drawing Sheets

(51) Int. Cl.
*B29C 65/48* (2006.01)
*B29C 65/00* (2006.01)
*B29C 65/76* (2006.01)
*B32B 7/06* (2019.01)

(52) U.S. Cl.
CPC .............. *B29C 65/76* (2013.01); *B29C 66/45* (2013.01); *B29C 66/73343* (2013.01); *B29C 66/73366* (2013.01); *B32B 7/06* (2013.01); *B32B 2264/301* (2020.08); *Y10T 428/25* (2015.01)

(58) Field of Classification Search
CPC ..... B29C 65/48; B29C 65/4825; B29C 66/45; B29C 66/73343; B29C 66/73366; G02B 1/111; G02B 1/118; G02B 5/0247; G02B 5/0294; G02B 5/128; Y10T 428/25
USPC ........... 156/60, 230, 235, 247, 272.2, 273.3, 156/273.5, 275.5, 275.7, 289, 297, 298, 156/307.1, 307.7; 359/601, 614, 586; 428/221, 323, 331, 332, 333, 338, 339
See application file for complete search history.

(56) References Cited

FOREIGN PATENT DOCUMENTS

| | | |
|---|---|---|
| JP | 2012-086475 A | 5/2012 |
| JP | 2016-095498 A | 5/2016 |
| WO | 2017/006936 A1 | 1/2017 |

OTHER PUBLICATIONS

International Search Report Issued in PCT/JP2018/005874 dated May 1, 2018.
Written Opinion Issued in PCT/JP2018/005874 dated May 1, 2018.
International Preliminary Report on Patentability issued in PCT/JP2018/005874 dated Oct. 1, 2019.

* cited by examiner

LAMINATE, METHOD OF MANUFACTURING LAMINATE, AND METHOD OF MANUFACTURING ANTIREFLECTION FILM

CROSS-REFERENCE TO RELATED APPLICATIONS

This application is a Continuation of PCT International Application No. PCT/JP2018/005874 filed on Feb. 20, 2018, which was published under PCT Article 21(2) in Japanese, and which claims priority under 35 U.S.C § 119(a) to Japanese Patent Application No. 2017-072558 filed on Mar. 31, 2017. The above applications are hereby expressly incorporated by reference, in their entirety, into the present application.

BACKGROUND OF THE INVENTION

1. Field of the Invention

The present invention relates to a laminate, a method of manufacturing a laminate, and a method of manufacturing an antireflection film.

2. Description of the Related Art

In an image display device such as a display device using a cathode ray tube (CRT), a plasma display panel (PDP), an electroluminescent display (ELD), a vacuum fluorescent display (VFD), a field emission display (FED), and a liquid crystal display device (LCD), an antireflection film may be provided in order to prevent decrease in contrast due to reflection of external light on a display surface and reflected glare of an image. In addition to the image display device, the antireflection function may be provided to a glass surface of the showroom or the like by an antireflection film.

As the antireflection film, an antireflection film having a fine uneven shape with a period equal to or less than the wavelength of visible light on the surface of a substrate, that is, an antireflection film having a so-called moth eye structure is known. The moth eye structure makes a refractive index gradient layer in which the refractive index successively changes in a pseudo manner from the air toward the bulk material inside the substrate, and reflection of the light can be prevented.

Further, as a technique for forming a functional layer in an optical film, a technique (transfer method) using a transfer member for forming a functional layer is known.

JP2016-095498A discloses a transfer member comprising a peeling substrate, mesoporous silica nanoparticles buried in a single layer and a removable state on the surface of the peeling substrate, and an antireflection member using the above transfer member.

JP2012-086475A discloses a thin film transfer material comprising a temporary support and fine particles lamination film formed on the surface of the temporary support.

SUMMARY OF THE INVENTION

However, the present inventors conducted research to find that, in the techniques of JP2016-095498A and JP2012-086475A, it was not possible to form an antireflection film having a low haze and a sufficient antireflection function.

An object of the present invention is to provide a laminate capable of being used in order to manufacture an antireflection film by a transfer method and manufacturing an antireflection film having a low haze and satisfactory antireflection properties, a method of manufacturing the laminate, and a method of manufacturing an antireflection film using the laminate.

The present inventors have assumed that it was not possible to form an antireflection film having a low haze because, as in the transfer members disclosed in JP2016-095498A and JP2012-086475A, in a case where particles in the transfer member are exposed to the air, an attractive force (horizontal capillary force) derived from surface tension works, to aggregate particles, and have conducted research to obtain an antireflection film having a low haze and satisfactory antireflection properties by using a transfer member (laminate) without exposure of the particles to the air.

That is, the present inventors have found that the above object can be achieved by the following means.

<1> A laminate comprising: a support; a layer (b) including a pressure sensitive adhesive; particles (a2) having an average primary particle diameter of 100 nm to 380 nm and a layer (ca) including a resin,
in which the layer (b) is provided closer to the support than the layer (ca),
the particles (a2) are buried in a layer obtained by combining the layer (b) and the layer (ca), and protrudes from an interface of the layer (ca) on the support side, and
a portion including the particles (a2) and the layer (ca) is peelable from the layer (b).
<2> The laminate according to <1>, in which a value obtained by subtracting a haze of a portion obtained by removing the portion including the particles (a2) and the layer (ca) from the laminate from the total haze of the laminate is 1.00% or less.
<3> The laminate according to <1> or <2>, in which a surface roughness of a surface of the layer (ca) on an opposite side to the layer (b) is 30 nm or less.
<4> The laminate according to any one of <1> to <3>, further comprising: a peelable member on a surface of the layer (ca) on an opposite side to the layer (b).
<5> A method of manufacturing a laminate, comprising, in this order: a step (1) of providing particles (a2) having an average primary particle diameter of 100 nm to 380 nm and a curable compound (a1) on a temporary support in a thickness in which the particles (a2) are buried in a layer (a) including the curable compound (a1);
a step (2) of curing a portion of the layer (a) to obtain a layer (ca):
a step (3) of bonding a layer (b) of a pressure sensitive film having a support and the layer (b) including a pressure sensitive adhesive on the support, to the layer (ca);
a step (4) of causing a position of an interface of the layer (ca) on the support side to come close to the temporary support side such that the particles (a2) are buried in a layer obtained by combining the layer (ca) and the layer (b) and protrudes from the interface of the layer (ca) on the support side; and
a step (5) of peeling the temporary support.
<6> The method of manufacturing a laminate according to claim 5, further comprising: a step (4-2) of curing a portion of the layer (ca) in a state in which the particles (a2) are buried in a layer obtained by combining the layer (ca) and the layer (b) between the step (4) and the step (5).
<7> The method of manufacturing a laminate according to <5> or <6>, in which, in the step (2), the portion of the layer (a) is cured by irradiation with ultraviolet rays at an irradiation amount of 1 to 90 mJ/cm$^2$, to obtain the layer (ca).

<8> A method of manufacturing an antireflection film using the laminate obtained by the method of manufacturing a laminate according to any one of <5> to <7>.

<9> The method of manufacturing an antireflection film according to <8>, comprising, in this order: a step (6) of bonding a layer (ca) of a laminate obtained by the method of manufacturing a laminate according to any one of <5> to <7> to a substrate:

a step (7) of curing the layer (ca) in a state in which the particles (a2) are buried in a layer obtained by combining the layer (ca) and a layer (b); and a step (8) of peeling the pressure sensitive film.

According to the present invention, a laminate which can be used to manufacture an antireflection film by a transfer method and can manufacture an antireflection film having a low haze and satisfactory antireflection properties, a method of manufacturing the laminate, and a method of manufacturing an antireflection film.

DESCRIPTION OF THE PREFERRED EMBODIMENTS

Figure 1:
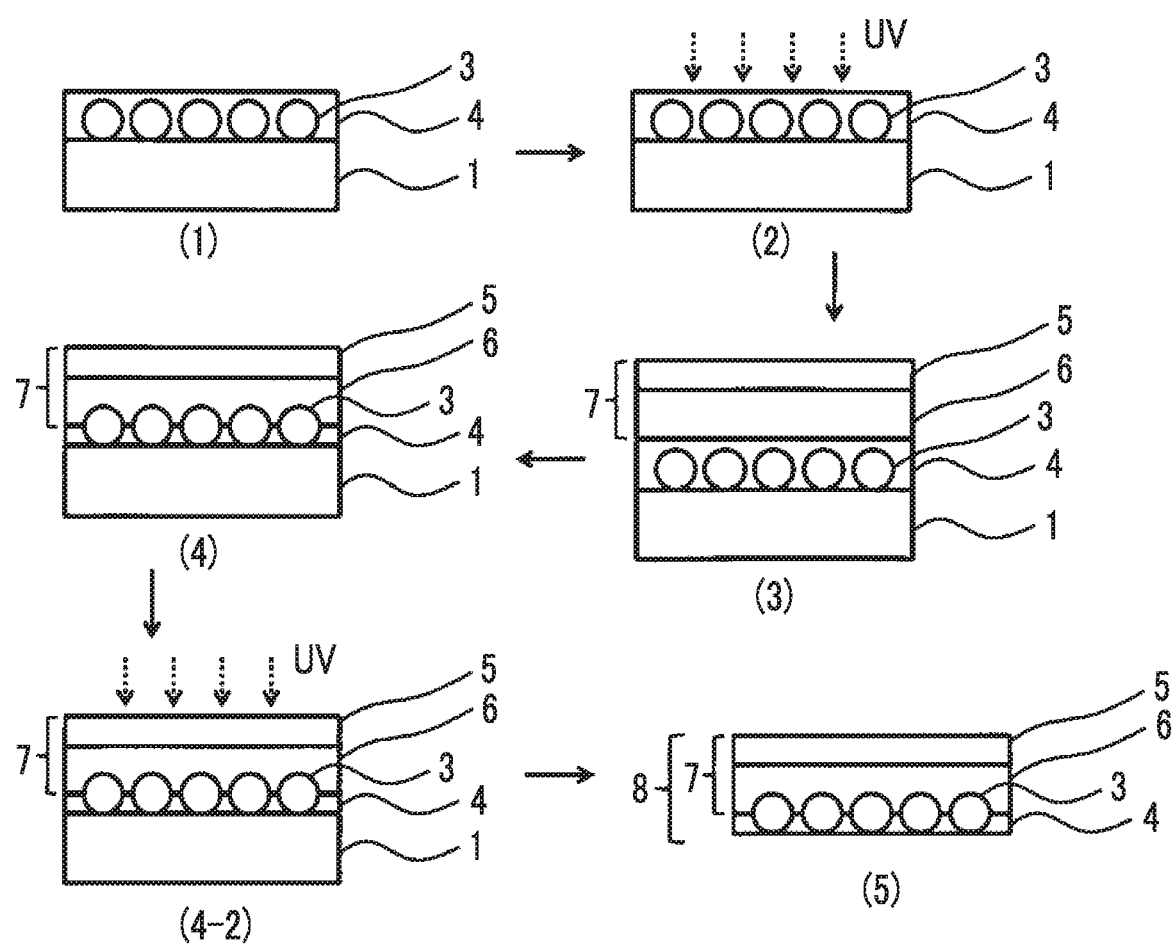
FIG. 1 is a schematic view for describing an example of a method of manufacturing a laminate according to the embodiment of the present invention.

In the present specification, "(meth)acrylate" refers to at least one of acrylate or methacrylate, "(meth)acryl" refers to at least one of acryl or methacryl, and "(meth)acryloyl" refers to at least one of acryloyl or methacryloyl.

The laminate according to the embodiment of the present invention is a laminate having a support, a layer (b) including a pressure sensitive adhesive, particles (a2) having an average primary particle diameter of 100 nm to 380 nm, and a layer (ca) including a resin, in which the layer (b) is provided closer to the support than the layer (ca), the particles (a2) is buried in a layer obtained by combining the layer (b) and the layer (ca) and protrudes from an interface on the support side of the layer (ca), and a portion including the particles (a2) and the layer (ca) is peeled off from the layer (b).

Since a portion of the laminate according to the embodiment of the present invention which includes the particles (a2) and the layer (ca) can be peeled off from the layer (b), a portion (antireflection layer) including the particles (a2) and the layer (ca) in the laminate according to the embodiment of the present invention can be transferred to a substrate by a transfer method by using the laminate according to the embodiment of the present invention, so as to manufacture the antireflection film. Accordingly, the laminate according to the embodiment of the present invention can be used as a transfer member for forming an antireflection layer.

Detailed descriptions of the laminate according to the embodiment of the present invention are described below, and the method of manufacturing the laminate and the method of manufacturing an antireflection film according to the embodiment of the present invention are described below.

[Method of Manufacturing Laminate and Method of Manufacturing Antireflection Film]

The method of manufacturing the laminate according to the embodiment of the present invention has a step (1) of providing the particles (a2) having an average primary particle diameter of 100 nm to 380 nm and a curable compound (a1) on a temporary support in a thickness in which the particles (a2) is buried in the layer (a) including the curable compound (a1), a step (2) of curing a portion of the layer (a) so as to obtain the layer (ca), a step (3) of bonding the support and the layer (b) of the pressure sensitive film having the layer (b) including the pressure sensitive adhesive on the support to the layer (ca), and a step (4) of causing a position of an interface of the layer (ca) on the support side to come close to the temporary support side, such that the particles (a2) are buried in a layer obtained by combining the layer (ca) and the layer (b), so as to protrude from the interface of the layer (ca) on the support side, and a step (5) of peeling the temporary support, in this order.

The method of manufacturing the laminate according to the embodiment of the present invention preferably has a step (4-2) of curing the portion of the layer (ca) in a state in which the particles (a2) are buried in a layer obtained by combining the layer (ca) and the layer (b), between the step (4) and the step (5).

The method of manufacturing the antireflection film according to the embodiment of the present invention is preferably a method of manufacturing an antireflection film using the laminate obtained by the method of manufacturing the laminate according to the embodiment of the present invention, and has a step (6) of bonding the layer (ca) of the laminate obtained by the method of manufacturing the laminate according to the embodiment of the present invention and the substrate, a step (7) of curing the layer (ca) in a state in which the particles (a2) are buried in the layer obtained by combining the layer (ca) and the layer (b), a step (8) of peeling the pressure sensitive film, in this order.

The method of manufacturing the antireflection film according to the embodiment of the present invention more preferably has a step (9) of curing the layer (ca) in a state in which the particles (a2) protrude from an interface of the layer (ca) on an opposite side to the interface on the substrate side after the step (8), and a step (10) of washing a solvent, in this order.

In the present invention, the expression "the particles (a2) are buried in the layer (a)" means that the thickness of the layer (a) is 0.8 times or more of the average primary particle diameter of the particles (a2).

According to the present invention, the expression "the particles (a2) are buried in the layer obtained by combining the layer (ca) and the layer (b)" indicates that the thickness of the layer obtained by combining the layer (ca) and the layer (b) is 0.8 times or more of the average primary particle diameter of the particles (a2).

In the present invention, in the step (1), in order to form the layer (a) in a thickness in which the particles (a2) are buried, in steps subsequent to the step (4), a surface of the particles (a2) protruding from the layer (ca) is coated with a thin layer of the layer (ca). The particles (a2) coated with the thin layer is called the particles (a2) for the sake of convenience.

First, an outline of an embodiment of the method of manufacturing the laminate according to the embodiment of the present invention is described with reference to FIG. 1.

FIG. 1 is a schematic view illustrating a preferable embodiment of the method of manufacturing a laminate according to the embodiment of the present invention.

(1) of FIG. 1 schematically illustrates a state in which the particles (a2) (reference numeral 3 in FIG. 1) having an average primary particle diameter of 100 nm to 380 nm in the layer (a) (reference numeral 4 in FIG. 1) including the curable compound (a1) is provided on a temporary support 1 in the step (1) in a thickness in which the particles (a2) are buried.

Figure 2:
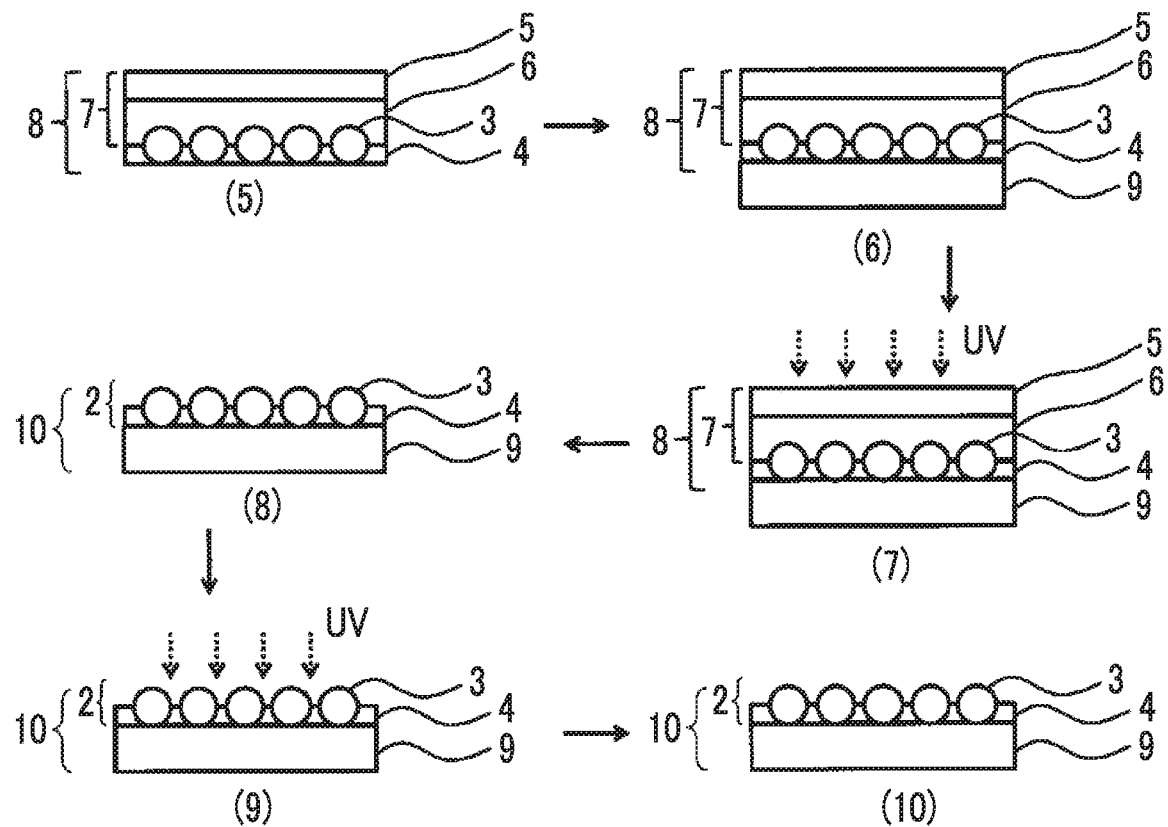
FIG. 2 is a schematic view for describing an example of a method of manufacturing an antireflection film according to the embodiment of the present invention.

(2) of FIG. 1 schematically illustrates a case where a portion of the layer (a) is cured in a state in which the particles (a2) are buried in the layer (a) in the step (2). The layer (ca) is obtained by curing a portion of the layer (a). In FIGS. 1 and 2, both of the layer (a) and the layer (ca) are represented by the same reference numeral 4, for the sake of convenience. "UV" represents ultraviolet rays.

(3) of FIG. 1 schematically illustrates a state in which the layer (b) of the pressure sensitive film 7 having a support 5 and a layer (b) (reference numeral 6 in FIG. 1) including a pressure sensitive adhesive on the support 5 is bonded to the layer (ca) (reference numeral 4 in FIG. 1) in the step (3).

(4) of FIG. 1 schematically illustrates a state in which a position of an interface of the layer (ca) on the support side is caused to come close to the temporary support side, such that the particles (a2) are buried in a layer obtained by combining the layer (ca) and the layer (b) and protrude from the interface (the interface of the layer (ca) and the layer (b)) of the layer (ca) on the support side, in the step (4). As described above, examples of the method of causing the position of the interface of the layer (ca) on the support side to come close to the temporary support side include a method of causing a portion of the curable compound (a1) to permeate the temporary support (in a case where the temporary support has a functional layer, to permeate the functional layer) or a method of causing a portion of the curable compound (a1) to permeate the layer (b) including a pressure sensitive adhesive.

(4-2) of FIG. 1 schematically illustrates a case where a portion of the layer (ca) is further cured in a state in which the particles (a2) are buried in a layer obtained by combining the layer (ca) and the layer (b) in the step (4-2).

(5) of FIG. 1 illustrates a state (a laminate 8) after the temporary support 1 is peeled off in the step (6) of peeling off the temporary support 1.

The step (5) is completed so as to obtain the laminate 8. Here, in the method of manufacturing the laminate according to the embodiment of the present invention, the step (4-2) is not necessary, and thus after the step (4), the step (5) may be performed after the step (4-2) is performed.

Subsequently, an outline of an embodiment of the method of manufacturing the antireflection film according to the embodiment of the present invention is described with reference to FIG. 2.

FIG. 2 is a schematic view illustrating a preferable embodiment of the method of manufacturing an antireflection film according to the embodiment of the present invention.

(6) of FIG. 2 schematically illustrates a state in which a substrate 9 is bonded to the layer (ca) (reference numeral 4 in FIG. 2) in the laminate 8 in the step (6).

(7) of FIG. 2 schematically illustrates a case where the layer (ca) is further cured in a state in which the particles (a2) are buried in a layer obtained by combining the layer (ca) and the layer (b) in the step (7).

(8) of FIG. 2 schematically illustrates a state after the pressure sensitive film 7 is peeled off in the step (8) of peeling off the pressure sensitive film 7. The step (8) is a step of peeling off the pressure sensitive film 7 from the laminate 8 and transferring a portion (reference numeral 2 in FIG. 2) including the particles (a2) (reference numeral 3 in FIG. 2) and the layer (ca) (reference numeral 4 in FIG. 2) in the laminate 8 to the substrate 9. A portion including the particles (a2) and the layer (ca) forms a moth eye structure in which the particles (a2) protrude from one surface of the layer (ca). That is, a portion including the particles (a2) and the layer (ca) is an antireflection layer. By the step (8), it is possible to obtain an antireflection film 10 having an antireflection layer having a moth eye structure including the particles (a2) and the layer (ca) on the substrate. In a stage in which the step (8) is completed, the antireflection film 10 can be obtained, but it is preferable to further perform the steps (9) and (10).

(9) of FIG. 2 schematically illustrates that the layer (ca) is further cured in a state in which the particles (a2) protrude from the interface of the layer (ca) on an opposite side to the interface on the substrate side in the step (9).

(10) of FIG. 2 illustrates the antireflection film 10 in a state after solvent washing is performed in the step (10).

Hereinafter, each step of the method of manufacturing the laminate and the method of manufacturing an antireflection film according to the embodiment of the present invention is specifically described.

[Step (1)]

The step (1) is a step of providing the curable compound (a1) and the particles (a2) having an average primary particle diameter of 100 nm to 380 nm on the temporary support, in a thickness in which the particles (a2) are buried in the layer (a) including the curable compound (a1).

As described above, according to the present invention, the expression "a thickness in which the particles (a2) are buried in the layer (a)" refers to a thickness of 0.8 times or more of an average primary particle diameter of the particles (a2).

In the step (1), a method of providing the layer (a) on the temporary support is not particularly limited, but it is preferable to provide the layer (a) by coating the temporary support with the layer (a). In this case, the layer (a) is a layer obtained by applying a composition for forming the layer (a) including the curable compound (a1) and the particles (a2) having an average primary particle diameter of 100 nm to 380 nm. The coating method is not particularly limited, and well-known methods can be used. Examples thereof include a dip coating method, an air knife coating method, a curtain coating method, a roller coating method, a wire bar coating method, a gravure coating method, and a die coating method.

In the layer (a) provided on the temporary support in the step (1), it is preferable that the plurality of particles (a2) are present in the direction orthogonal to the surface of the layer (a). Here, the expression "the plurality of particles (a2) are not present in the direction orthogonal to the surface of the layer (a)" indicates that, in a case where 10 µm×10 µm of the in-plane of the layer (a) is observed with three visual fields with a scanning electron microscope (SEM), the proportion of the number of particles (a2) in a state in which a plurality of the particles are not present in the direction orthogonal to the surface is 80% or more and preferably 95% or more.

(Temporary Support)

The temporary support is not particularly limited as long as the support has a smooth surface. It is preferable that the temporary support has a surface flatness with a surface roughness of about 30 nm or less and does not prevent the application of the composition for forming the layer (a), and temporary supports including various materials can be used, but for example, a polyethylene terephthalate (PET) film or a cycloolefin-based resin film is preferably used.

In the present invention, the surface roughness is measured by using SPA-400 (manufactured by Hitachi High-Tech Science Corporation) under measurement conditions of a measurement range of 5 μm×5 μm, a measurement mode of DFM, and a measurement frequency of 2 Hz.

(Layer (a))

The layer (a) is a layer including the curable compound (a1).

The curable compound (a1) included in the layer (a) is cured to become a resin (binder resin) in the antireflection layer.

The film thickness of the layer (a) in the step (1) is preferably 0.8 times to 2.0 times, more preferably 0.8 times to 1.5 times, and even more preferably 0.9 times to 1.2 times of an average primary particle diameter of the particles (a2).

<Curable Compound (A1)>

The curable compound (a1) is preferably a compound (preferably an ionizing radiation curable compound) having a polymerizable functional group. As the compound having a polymerizable functional group, various monomer oligomers, and polymers can be used. As the polymerizable functional group (polymerizable group), photopolymerizable, electron beam polymerizable, or radiation polymerizable groups are preferable. Among the groups, a photopolymerizable functional group is preferable.

Examples of the photopolymerizable functional group include a polymerizable unsaturated group (carbon-carbon unsaturated double bond group) such as a (meth)acryloyl group, a vinyl group, a styryl group, and an allyl group. Among the groups, a (meth)acryloyl group is preferable.

Specific examples of the compound having a polymerizable unsaturated group include (meth)acrylic acid diesters of alkylene glycol such as neopentyl glycol acrylate, 1,6-hexanediol (meth)acrylate, and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate; and (meth)acrylic acid diesters of an ethylene oxide or propylene oxide adduct such as 2,2-bis{4-(acryloxy.diethoxy) phenyl} propane, and 2-2-bis{4-(acryloxy.polypropoxy) phenyl} propane.

Epoxy (meth)acrylates, urethane (meth)acrylates, and polyester (meth)acrylates are also preferably used as a compound having a photopolymerizable functional group.

Among these, esters of polyhydric alcohol and (meth) acrylic acid are preferable. More preferably, it contains at least one polyfunctional monomer having three or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphate tri(meth)acrylate, trimethylol ethane tri(meth)acrylate, ditrimethylolpropane tetra(meth)acrvlate, dipentaerythritol tetra(meth)acrylate, dipentaerythritol penta (meth)acrylate, dipentaerythritol hexa(meth)acrylate, pentaerythritol hexa (meth)acrylate, 1,2,3-cyclohexane tetramethacrylate, polyurethane polyacrylate, polyester polyacrylate, and caprolactone-modified tris(acryloxyethyl) isocyanurate.

Specific compounds of polyfunctional acrylate-based compounds having (meth)acryloyl groups include esterified products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20. KAYARAD DPCA-30, KAYARAD DPCA-60, and KAYARAD GPO-303 manufactured by Nippon Kayaku Co. Ltd., and V #3PA. V #400, V #36095D. V #1000, and V #1080 manufactured by Osaka Organic Chemical Industry Ltd. A trifunctional or higher functional urethane acrylate compound such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B. SHIKOH UV-3200B, SHIKOH UV-3210EA, SHIKOH UV-3310EA, SHIKOH UV-3310B. SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by Nippon Synthetic Chem Industry Co., Ltd.), UA-306 H, UA-306 I, UA-306 T, and UL-503 LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K. EB-220, EB-5129, EB-1830, and EB-4858 (manufactured by Daicel-UCB Corporation), U-4HA, U-6HA, U-10HA, and U-15HA (manufactured by Shin Nakamura Chemical Co., Ltd.), HIGH-COAP AU-2010 and HIGH-COAP AU-2020 (manufactured by Tokushiki Co., Ltd.), ARONIX M-1960 (manufactured by Toagosei Co., Ltd.), ARTRESIN UN-3320HA, UN-3320HC, UN-3320HS, UN-904, and HDP-4T (manufactured by Negami Chemical Industrial Co., Ltd.), trifunctional or higher functional polyester compounds such as ARONIX M-8100. M-8030, and M-9050 (manufactured by Toagosei Co., Ltd.), and KRM-8307 (manufactured by Daicel-Allnex Ltd.) can be suitably used.

Examples thereof include a resin having three or more polymerizable functional groups, for example, a polyester resin having a relatively low molecular weight, a polyether resin, an acrylic resin, an epoxy resin, an urethane resin, an alkyd resin, a spiroacetal resin, a polybutadiene resin, and a polythiol polyene resin, or an oligomer or a prepolymer of a polyfunctional compound such as polyhydric alcohol.

Compounds disclosed in JP2005-076005A and JP2005-036105A, dendrimers such as SIRIUS-501 and SUBARU-501 (manufactured by Osaka Organic Chemical Industry Ltd.), and norbomene ring-containing monomers disclosed in JP2005-060425A can be used.

In order to obtain a strong film by bonding the particles (a2) and the curable compound (a1) to each other, a silane coupling agent having a polymerizable functional group may be used as the curable compound (a1).

Specific examples of a silane coupling agent having a polymerizable functional group include 3-(meth)acryloxypropyltrimethoxysilane, 3-(meth)acryloxypropy Imethyldimethoxysilane, 3-(meth)acryloxypropyldimethylmethoxysilane, 3-(meth)acryloxypropylmethyldiethoxysilane, 3-(meth)acryloxypropyl triethoxysilane, 2-(meth)acryloxyethyltrimethoxysilane, 2-(meth)acryloxvethyltriethoxysilane, 4-(meth)acryloxybutyltrimethoxvsilane, and 4-(meth) acyloxybutyltriethoxysilane. Specific examples thereof include KBM-503 and KBM-5103 (manufactured by Shin- Etsu Chemical Co., Ltd.), silane coupling agents X-12-1048, X-12-1049, and X-12-1050 (manufactured by Shin-Etsu Chemical Co., Ltd.) disclosed in JP2014-123091A, and a compound C3 represented by the following structural formula.

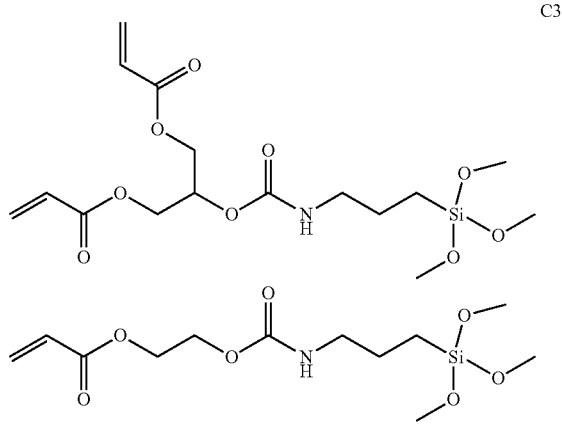

As a compound working so as to suppress the aggregation of the particles (a2), a silane coupling agent which has polymerizable functional groups other than a radical reactive group may be used. Specific examples of the silane coupling agent which has polymerizable functional groups other than a radical reactive group include KBM-303, KBM-402, KBM-403, KBE-402. KBE-403, and KBM-4803 (manufactured by Shin-Etsu Chemical Co., Ltd.).

Two or more types of the compounds having a polymerizable functional group may be used in combination. The polymerization of these compounds having a polymerizable functional group can be performed by irradiation with ionizing radiation or heating under the presence of a photo-radical initiator or a thermal radical initiator.

The layer (a) can further include a compound in addition to the curable compound (a1).

According to the present invention, as the curable compound (a1), a compound having two or less polymerizable functional groups in one molecule may be used. Particularly, it is preferable that the compound having three or more polymerizable functional groups in one molecule and a compound having two or less polymerizable functional groups in one molecule or a compound not having a polymerizable functional group as a compound other than the curable compound (a1) are used in combination.

The compound having two or more polymerizable functional groups in one molecule or a compound not having a polymerizable functional group is preferably a compound in which a weight-average molecular weight Mwa is $40<Mwa<500$.

The compound having two or less polymerizable functional groups in one molecule is preferably a compound having one polymerizable functional group in one molecule.

The viscosity of the compound having two or more polymerizable functional groups in one molecule or the compound not having a polymerizable functional group at 25° C. is preferably 100 mPas or less and more preferably 1 to 50 mPas. The compound in this viscosity range is preferable since the compound works so as to suppress aggregation of the particles (a2) such that haze and muddiness can be suppressed.

The compound having two or less polymerizable functional groups in one molecule preferably has a (meth) acryloyl group, an epoxy group, an alkoxy group, a vinyl group, a styryl group, and an allyl group as the polymerizable functional group.

As the compound not having a polymerizable functional group, an ester-based compound, an amine-based compound, an ether-based compound, an aliphatic alcohol-based compound, a hydrocarbon-based compound, and the like can be preferably used, and an ester-based compound is particularly preferable. More specific examples thereof include dimethyl succinate (viscosity 2.6 mPas), diethyl succinate (viscosity 2.6 mPas), dimethyl adipate (viscosity 2.8 mPas), dibutyl succinate (viscosity: 3.9 mPas), bis(2-butoxyethyl) adipate (viscosity 10.8 mPas), dimethyl suberate (viscosity: 3.7 mPas), diethyl phthalate (viscosity: 9.8 mPas), dibutyl phthalate (viscosity: 13.7 mPas), triethyl citrate (viscosity: 22.6 mPas), acetyl triethyl citrate (viscosity: 29.7 mPas), and diphenyl ether (viscosity: 3.8 mPas).

The weight-average molecular weight and the number-average molecular weight according to the present invention are a value measured in the following conditions by the gel permeation chromatography (GPC).
[Solvent] Tetrahydrofuran
[Device Name] TOSOH HLC-8220GPC
[Column] Three items of TOSOH TSKgel Super HZM-H (4.6 mm×15 cm) are linked to be used.
[Column temperature] 25° C.
[Sample concentration] 0.1 mass %
[Flow rate] 0.35 ml/min
[Calibration Curve] A calibration curve with seven samples of TSK standard polystyrene manufactured by TOSOH Corporation Mw=2,800,000 to 1,050 is used.

The coating amount of the curable compound (a1) included in the layer (a) is preferably 100 mg/m² to 800 mg/m², more preferably 100 mg/m² to 600 mg/m, and particularly preferably 100 mg/m² to 400 mg/m².

In a case where the curable compound (a1) and a compound not having a polymerizable functional group are used in combination, the total coating amount thereof is preferably in the above range.

<Particles (a2) having an average primary particle diameter of 100 nm to 380 nm>

The particles (a2) having an average primary particle diameter of 100 nm to 380 nm is referred to as the "particles (a2)".

The particles (a2) are particles protruding from the surface of the film (the layer (ca)) formed of the binder resin in the antireflection film and having an uneven shape (moth eye structure).

Examples of the particles (a2) include metal oxide particles, resin particles, and organic-inorganic hybrid particles having a core of a metal oxide particle and a shell of a resin. In view of excellent film hardness, the metal oxide particles are preferable.

Examples of the metal oxide particles include silica particles, titania particles, zirconia particles, and antimony pentoxide particles. Since the refractive index is close to many binders, haze is hardly generated and the moth eye structure is easily formed. Therefore, silica particles are preferable.

Examples of the resin particles include polymethyl methacrylate particles, polystyrene particles, and melamine particles.

In view of forming a moth eye structure by arranging particles side by side, the average primary particle diameter of the particles (a2) is 100 nm to 380 nm, preferably 100) nm to 300) nm, more preferably 150 nm to 250 nm, and even more preferably 170 nm to 220 nm.

Only one kind of the particles (a2) may be used singly, or two or more kinds of particles having different average primary particle diameters may be used.

The average primary particle diameter of the particles (a2) refers to the cumulative 50% particle diameter of the volume-average particle diameter. A scanning electron microscope (SEM) can be used to measure the particle diameter. A powder particle (in a case of a dispersion liquid, ones obtained by volatilizing a solvent by drying) is observed at the appropriate magnification (about 5000 times) by scanning electron microscope (SEM) observe, the diameter of each of 100 primary particles is measured, the volume thereof is calculated, and the cumulative 50% particle diameter can be taken as the average primary particle diameter. In a case where the particles are not spherical, the average value of the long diameter and the short diameter is regarded as the diameter of the primary particle. In a case where the particles contained in the antireflection film are measured, it is calculated by observing the antireflection film from the front surface side by SEM in the same manner as described above. In this case, for easier observation, carbon vapor deposition, an etching treatment, and the like may be suitably applied to the sample.

A shape of the particle (a2) is most preferably a spherical shape, but may be a shape other than a spherical shape such as an amorphous shape.

The particles (a2) may be solid particles or may be hollow particles, but is preferably solid particles.

The silica particles may be crystalline or amorphous.

As the particles (a2), surface-treated inorganic fine particles are preferably used for improving the dispersibility in the coating solution, improving the film hardness, and preventing aggregation. Specific examples and preferable examples of the surface treatment method are in the same manner as those described in <0119> to <0147> of JP2007-298974A.

Particularly, in view of providing the binding properties to the curable compound (a1) which is a binder component and improving the film hardness, it is preferable that the surface of the particle is surface-modified with a compound having a functional group having reactivity with an unsaturated double bond and the particle surface, and an unsaturated double bond is applied to the particle surface. As the compound used in the surface modification, a silane coupling agent having a polymerizable functional group described above as the curable compound (a1) can be appropriately used.

Specific examples of the particles having an average primary particle diameter of 10) nm to 380 nm include SEAHOSTAR KE-P10 (average primary particle diameter: 100 nm, amorphous silica manufactured by Nippon Shokubai Co. Ltd.), SEAHOSTAR KE-P30 (average primary particle diameter: 300 nm, amorphous silica manufactured by Nippon Shokubai Co., Ltd.), SEAHOSTAR KE-S30 (average primary particle diameter: 300 nm, heat resistance: 1,000° C., calcined silica manufactured by Nippon Shokubai Co., Ltd.), EPOSTAR S (average primary particle diameter: 200 nm, a melamine-formaldehyde condensate manufactured by Nippon Shokubai Co., Ltd.), EPOSTAR MA-MX100W (average primary particle diameter: 175 nm, polymethylmethacrylate (PMMA) crosslinked product manufactured by Nippon Shokubai Co., Ltd.), EPOSTAR MA-MX200W (average primary particle diameter: 350 nm, polymethylmethacrylate (PMMA) crosslinked product manufactured by Nippon Shokubai Co., Ltd.), STAFYROID (multilayer structure organic fine particles manufactured by Aica Kogyo Company, Limited), and GANZPEARL (polymethyl methacrylate, polystyrene particles manufactured by Aica Kogyo Company, Limited) can be preferably used.

Since the amount of hydroxyl groups on the surface is moderately large and the particles are hard, the particles (a2) are particularly preferably calcined silica particles.

The calcined silica particles can be manufactured by a well-known technique of hydrolyzing and condensing a hydrolyzable silicon compound in an organic solvent including water and a catalyst to obtain silica particles and calcining the silica particles, and, for example, JP2003-176121A and JP2008-137854A can be referred to.

The silicon compound as a raw material for manufacturing the calcined silica particles is not particularly limited, and examples thereof include a chlorosilane compound such as tetrachlorosilane, methyltrichlorosilane, phenyltrichlorosilane, dimethyldichlorosilane, diphenyldichlorosilane, methyl vinyl dichlorosilane, trimethylchlorosilane, and methyl diphenylchlorosilane; an alkoxy silane compound such as tetramethoxy silane, tetraethoxy silane, tetraisopropoxy silane, tetrabutoxy silane, methyltrimethoxy silane, methyltriethoxy silane, trimethoxyvinyl silane, triethoxyvinyl silane, 3-glycidoxypropyltrimethoxy silane, 3-chloropropyltrimethoxy silane, 3-mercaptopropyltrimethoxy silane, 3-(2-aminoethylamino) propyltrimethoxy silane, phenyltrimethoxy silane, phenyltriethoxy silane, dimethyl dimethoxy silane, dimethyl diethoxy silane, 3-glycidoxypropylmethyldimethoxy silane, 3-glycidoxypropylmethyldiethoxy silane, 3-chloropropylmethyldimethoxy silane, diphenyldimethoxy silane, diphenyldiethoxy silane, dimethoxydiethoxy silane, trimethylmethoxy silane, and trimethylethoxy silane; an acyloxy silane compound such as tetraacetoxy silane, methyl triacetoxy silane, phenyl triacetoxy silane, dimethyl diacetoxy silane, diphenyl diacetoxy silane, and trimethylacetoxy silane; and a silanol compound such as dimethyl silanediol, diphenyl silanediol, and trimethylsilanol. Among the exemplary silane compounds, an alkoxysilane compound is particularly preferable, since alkoxysilane compound can be obtained more easily and halogen atoms as impurities in the obtained calcined silica particles are not included. As a preferred embodiment of the calcined silica particles according to the present invention, it is preferable that the content of halogen atoms is substantially 0%, and halogen atoms are not detected.

The calcining temperature is not particularly limited, but is preferably 800° C. to 1,300° C. and more preferably 1,000° C. to 1,200° C.

The coating amount of the curable compound (a2) included in the layer (a) is preferably 50 mgim$^2$ to 200 mg/m$^2$, more preferably 100 mg/m$^2$ to 180 mg/m$^2$, and particularly preferably 130 mg/m$^2$ to 170 mg/m. In a case where the coating amount is the lower limit or more, a large number of protrusions of the moth eye structure can be formed, and thus the antireflection performance are more easily improved. In a case where the coating amount is the upper limit or less, aggregation in the liquid hardly occurs and a satisfactory moth eye structure is easily formed.

It is preferable that only one kind of the monodispersed silica fine particles having an average primary particle diameter of 100 nm to 380 nm and having a dispersion degree (CV value) of the particle diameter of less than 5% is contained, since the height of the unevenness of the moth eye structure becomes homogeneous and the reflectivity is further decreased. The CV value is usually measured using a laser diffraction type particle diameter determination device, but other particle diameter measuring methods may be used, or particle size distribution can be calculated and obtained from the surface SEM image of the antireflection layer of the present invention by image analysis. The CV value is more preferably less than 4%.

The layer (a) may contain a component in addition to the curable compound (a1) and the particles (a2), and examples thereof include the compound not having a polymerizable functional group, a solvent, a polymerization initiator, a dispersing agent of the particles (a2), a leveling agent, and an antifouling agent.

<Solvent>

In view of improving the dispersibility, it is preferable to select a solvent having a polarity close to that of the particles (a2). Specifically, for example, in a case where the particles (a2) are metal oxide particles, an alcohol-based solvent is preferable, and examples thereof include methanol, ethanol, 2-propanol, 1-propanol, and butanol. For example, in a case where the particles (a2) are metal resin particles subjected to hydrophobic surface modification, ketone-based, ester-based, carbonate-based, alkane, aromatic solvents, and the like are preferable, and examples thereof include methyl ethyl ketone (MEK), dimethyl carbonate, methyl acetate, acetone, methylene chloride, and cyclohexanone. A plurality of these solvents may be mixed to be used without remarkably deteriorating the dispersibility.

<Dispersing agent of particles (a2)>

The dispersing agent of the particles (a2) lowers the cohesive force between the particles such that the particles (a2) can be easily arranged in a uniform manner. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and a polymer compound is more preferable since the polymer compound has a high degree of freedom in selecting adsorptive groups and steric repulsive groups. As the dispersing agent, a commercially available product can be used. Examples thereof include DISPERBYK160, DISPERBYK161, DISPERBYK162, DISPERBYK163, DISPERBYK164, DISPERBYK166, DISPERBYK167, DISPERBYK171. DISPERBYK180, DISPERBYK182, DISPERBYK2000, DISPERBYK2001, DISPERBYK2164, Bykumen, BYK-2009, BYK-P104, BYK-P104S, BYK-220S, Anti-Terra203, Anti-Terra204, and Anti-Terra205 (all are trade names) manufactured by BYK Japan KK.

<Leveling Agent>

The leveling agent lowers the surface tension of the composition for forming the layer (a), such that the liquid after coating is stabilized and the curable compound (a1) and the particles (a2) are easily arranged in a uniform manner. For example, compounds disclosed in JP2004-331812A and JP2004-163610A can be used.

The content of the leveling agent is preferably 0.01 to 5.0 mass %, more preferably 0.01 to 3.0 mass %, and particularly preferably 0.01 to 2.0 mass % with respect to the total solid content of the composition for forming the layer (a).

<Antifouling Agent>

The antifouling agent provides water and oil repelling properties to the moth eye structure, such that adhesion of dirt and fingerprints can be suppressed. For example, compounds disclosed in JP2012-88699A can be used.

The content of the antifouling agent is preferably 0.01 to 5.0 mass %, more preferably 0.01 to 3.0 mass %, and particularly preferably 0.01 to 2.0 mass % with respect to the total solid content of the antifouling agent in the layer (a).

<Polymerization Initiator>

A polymerization initiator may be used in the layer (a).

In a case where the curable compound (a1) is a photopolymerizable compound, it is preferable to include a photopolymerization initiator.

Examples of the photopolymerization initiator include acetophenones, benzoins, benzophenones, phosphine oxides, ketals, anthraquinones, thioxanthones, an azo compound, peroxides, 2,3-dialkyldione compounds, disulfide compounds, fluoroamine compounds, aromatic sulfoniums, lophine dimers, onium salts, borate salts, active esters, active halogens, an inorganic complex, and coumarins. Specific examples, preferable aspects, commercially available products and the like of the photopolymerization initiator are disclosed in paragraphs<0133> to <0151> of JP2009-098658A and can be appropriately used in the present invention in the same manner.

Various examples are provided in "Newest UV curing technology" {Technical Information Institute Co. Ltd.} (1991), page 159 and "Ultraviolet Curing System" written by Kiyomi KATO (published in 1989 by The Integrated Technology Center), pages 65 to 148, and are useful in the present invention.

The content of the polymerization initiator in the layer (a) is an amount sufficient for polymerizing the polymerizable compound included in the layer (a) and is preferably 0.1 to 8 mass % and more preferably 0.5 to 5 mass % with respect to the total solid content in the layer (a) such that the starting point does not excessively increase.

For the reaction of the silane coupling agent described above, a compound that generates an acid or a base by light or heat (hereinafter, sometimes referred to as a photoacid generator, a photobase generator, a thermal acid generator, or a thermal base generator) may be included.

<Photoacid Generator>

Examples of the photoacid generator include onium salt such as diazonium salt, ammonium salt, phosphonium salt, iodonium salt, sulfonium salt, selenonium salt, and an arsonium salt, an organohalogen compound, organometallic/organic halide, a photoacid generator having an o-nitrobenzyl-based protecting group, a compound that is photolyzed to generate sulfonic acid and is represented by iminosulfonate and the like, a disulfone compound, diazoketosulfone, and a diazodisulfone compound. Examples thereof also include triazines (for example, 2-(4-methoxyphenyl)-4,6-bis(trichloromethyl)-1,3,5-triazine, and the like), quaternary ammonium salts, a diazomethane compound, an imide sulfonate compound, and an oxime sulfonate compound.

A group that generates an acid by light or a compound obtained by introducing a compound into a main chain or a side chain of a polymer can be used.

Compounds that generate acid by light which are disclosed in V. N. R Pillai, Synthesis, (1), 1 (1980), A. Abad et al., Tetrahedron Lett., (47) 4555 (1971). D. H. R. Barton et al., J. Chem. Soc., (C), 329 (1970), U.S. Pat. No. 3,779, 778A, and EP126,712B can be used.

<Thermal Acid Generator>

Examples of the thermal acid generator include salt including an acid and an organic base.

Examples of the acid described above include organic acid such as sulfonic acid, phosphonic acid, and carboxylic acid and inorganic acid such as sulfuric acid and phosphoric acid. In view of compatibility with the curable compound (a1), organic acid is more preferable, sulfonic acid and phosphonic acid are more preferable, and sulfonic acid is particularly preferable. Preferable examples of sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH), and nonafluorobutane-1-sulfonic acid (NFBS).

As specific examples of the acid generator, acid generators disclosed in JP2016-000803A can be appropriately used.

<Photobase Generator>

Examples of the photobase generator include a substance that generates bases by the action of active energy rays. More specifically, (1) a salt of organic acid and a base which is decomposed by decarburization by irradiation with ultraviolet rays, visible light, or infrared rays, (2) a compound decomposed by intramolecular nucleophilic substitution reaction or dislocation reaction to emit amines, or (3) a substance which causes some chemical reaction by irradiation with ultraviolet rays, visible light, or infrared rays to emit a base can be used.

The photobase generator used in the present invention is not particularly limited, as long as the photobase generator is a substance that generates a base by the action of active energy rays such as ultraviolet rays, electron beams, X-rays, infrared rays, and visible light.

Specifically, photobase generators disclosed in JP2010-243773A can be appropriately used.

The content of the compound that generates an acid or a base by light or heat in the layer (a) is an amount sufficient for polymerizing the polymerizable compound included in the layer (a) and is preferably 0.1 to 8 mass % and more preferably 0.1 to 5 mass % with respect to the total solid content in the layer (a) such that the starting point does not excessively increase.

[Step (2)]

The step (2) is a step of curing a part of the layer (a) in the step (1) to obtain a layer (ca), specifically, curing a portion of the curable compound (a1) in the layer (a) of the step (1) to obtain the layer (ca) including the cured compound (a1c).

In a case where a portion of the curable compound (a1) is cured in the step (2), the particles (a2) are caused to hardly move such that the aggregation of the particles (a2) can be suppressed.

The expression "a portion of the curable compound (a1) is cured" means that not the entire curable compound (a1) is cured, but only a portion thereof is cured. By a method of curing only a portion of the curable compound (a1) in the step (2), causing a portion of the uncured curable compound (a1) to permeate (permeat to a functional layer in a case where the temporary support has the functional layer) a temporary support in the step (4) or a method of causing permeation to the layer (b), the thickness of the layer (ca) is reduced so as to cause the particles (a2) to protrude from the interface of the layer (ca) on the support side, such that a satisfactory unevenness shape (moth eye structure) can be formed.

The curing can be performed by irradiation with ionizing radiation. The kind of ionizing radiation is not particularly limited, and examples thereof include X-rays, electron beams, ultraviolet rays, visible light, infrared rays, but the curable compound (a1) is a photocurable compound, and it is preferable to cure a portion of the curable compound (a1) by irradiation with light (preferably ultraviolet light) in the step (2).

In a case where the temporary support is coated with the composition excluding the particles (a2) from the composition for forming the layer (a) in a thickness of 2 µm and the composition is cured, the condition of curing a portion of the curable compound (a1) in the step (2) is preferably a condition in which a curing rate becomes 2% to 20%, more preferably a condition in which a curing rate becomes 3% to 15%, and even more preferably a condition in which a curing rate becomes 5% to 12%.

The curing rate is obtained from the following expression.

(1−the number of residual polymerizable functional groups after curing/the number of polymerizable functional groups before curing)×100%

The polymerizable functional group is a group having a polymerizable carbon-carbon unsaturated double bond. The curing rate is measured in the following method.

Specifically, NICOLET6700 Fourier transform infrared spectrophotometer (FT-IR) of Thermo electron corporation is used, KBr-IR of the curable compound before curing is measured, a peak (1,660-1,800 $cm^{-1}$) area of the carbonyl group and a peak height (808 $cm^{-1}$) of the polymerizable carbon-carbon unsaturated double bond are determined, a peak of the polymerizable carbon-carbon unsaturated double bond with respect to the carbonyl group peak area is obtained in the same manner as in the infrared spectroscopy (IR) measurement of single reflection after curing, and peaks before and after ultraviolet ray irradiation are compared, so as to calculate the curing rate. Here, with respect to the calculation of the curing rate, the measured depth at 808 $cm^{-1}$ is regulated as 821 nm, and the depth at 1660-1800 $cm^{-1}$ is regulated as 384 nm.

In the step (2), the ultraviolet ray is preferably applied in the irradiation amount of 1 to 90 $mJ/cm^2$, more preferably applied in the irradiation amount of 1.2 to 40 $mJ/cm^2$, and even more preferably applied in the irradiation amount of 1.5 to 10 $mJ/cm^2$. The optimum value of the irradiation amount varies depending on the formulation of the composition for forming the layer (a), and can be appropriately adjusted.

In the step (2), it is preferable that a portion of the curable compound (a1) is cured by irradiation with the ultraviolet ray from the opposite to the temporary support side of the substrate, in view of manufacturing suitability.

It is preferable that the step (2) is performed in the environment of the oxygen concentration of 0.1 to 5.0 volume %, and it is more preferable that the step (2) is performed in the environment of the oxygen concentration of 0.5 to 1.0 volume %. In a case where the oxygen concentration is caused to be in the above range, particularly, the region on the temporary support side of the layer (a) can be cured.

The compound (a1c) is a cured product of the curable compound (a1).

The molecular weight of the compound (a1c) is not particularly limited. The compound (a1c) may have an unreacted polymerizable functional group.

The layer (ca) obtained in the step (2) is a layer including the curable compound (a1) and the compound (a1c) in the layer.

In the present invention, after the step (2), in the steps (4-2), (7), and (9), the layer (ca) can be further cured, components contained in each layer and formulation (formulation ratios of the curable compound (a1) and the compound (a1c) which is a cured product thereof) thereof are different before curing and after curing in each step, but in the present invention, the layer is called the layer (ca) in any steps, for the sake of convenience.

[Step (3)]

A step (3) is a step of bonding a layer (b) of a pressure sensitive film having a support and the layer (b) including a pressure sensitive adhesive on the support to the layer (ca).

The method of bonding the layer (ca) and the layer (b) of the pressure sensitive film is not particularly limited, and well-known methods may be used. Examples thereof include a lamination method.

It is preferable to bond a pressure sensitive film such that the layer (ca) and the layer (b) are in contact with each other.

Before the step (3), a step of drying the layer (ca) may be provided. In a case of having a step of drying the layer (ca), the drying temperature of the layer (ca) is preferably 20° C. to 60° C. and more preferably 20° C. to 40° C. The drying time is preferably 0.1 to 120 seconds and more preferably 1 to 30 seconds.

According to the present invention, the layer (b) of the pressure sensitive film and the layer (ca) are bonded to each other in the step (3), the particles (a2) are buried in the layer obtained by combining the layer (ca) and the layer (b) in the step (4), the particles (a2) are caused to protrude from the interface of the layer (ca) on the support side, or it is more preferable that a portion of the layer (ca) is further cured in a state in which the particles (a2) are buried in the layer obtained by combining the layer (ca) and the layer (b) in the step (4-2) described below, such that the particles (a2) are not exposed to an air interface of the layer (ca) before curing, and aggregation is suppressed, so as to manufacture a satisfactory uneven shape formed by the particles (a2).

(Pressure Sensitive Film)

The pressure sensitive film has a support and the layer (b) including a pressure sensitive adhesive.

<Layer (b)>

The layer (b) is a layer of including a pressure sensitive adhesive, and the pressure sensitive adhesive is preferably a pressure sensitive adhesive having a gel fraction of 95.0% or more.

In a case where a gel fraction of the pressure sensitive adhesive is 95.0% or more, in the manufacturing of the antireflection film according to the embodiment of the present invention, in a case of peeling the pressure sensitive film, the pressure sensitive adhesive component hardly remains on the antireflection film surface, and thus an effect of suppressing the increase of the reflectivity caused by the filling of portions between unevenness of the particles with the pressure sensitive adhesive component is high.

The gel fraction of the pressure sensitive adhesive is preferably in the range of 95.0% to 99.9%, more preferably in the range of 97.0% to 99.9%, and even more preferably in the range of 98.0% to 99.9%.

The gel fraction of the pressure sensitive adhesive is a proportion of an insoluble matter after the pressure sensitive adhesive is immersed in tetrahydrofuran (THF) at 25° C. for 12 hours and is obtained from the following expression.

Gel fraction=(mass of insoluble matter of pressure sensitive adhesive in THF)/(total mass of pressure sensitive adhesive)×100(%)

The weight-average molecular weight of the sol component in the pressure sensitive adhesive is preferably 10.000 or less, more preferably 7,000 or less, and particularly preferably 5,000 or less. By setting the weight-average molecular weight of the sol component within the above range, in the manufacturing of an antireflection film according to the embodiment of the present invention, in a case of peeling the pressure sensitive film, the component of the pressure sensitive adhesive can be caused to hardly remain on the antireflection film surface.

The sol component of the pressure sensitive adhesive represents a dissolution amount in THF after the pressure sensitive adhesive is immersed in tetrahydrofuran (THF) at 25° C. for 12 hours. The weight-average molecular weight can be analyzed by gel permeation chromatography (GPC).

It is also preferable that a storage modulus of elasticity (G') of the pressure sensitive adhesive at 30° C. and 1 Hz is 1.3 GPa or less, and the weight-average molecular weight of the sol component in the pressure sensitive adhesive is 10,000 or less.

It is also preferable that a storage modulus of elasticity (G') of the pressure sensitive adhesive at 30° C. and 1 Hz is $1.3 \times 10^5$ Pa or less, and the weight-average molecular weight of the sol component in the pressure sensitive adhesive is 10,000 or less.

The storage modulus of elasticity (G') of the pressure sensitive adhesive at 30° C. and 1 Hz is more preferably $0.1 \times 10'$ Pa to $1.3 \times 10'$ Pa and even more preferably $0.1 \times 10^5$ Pa to $1.2 \times 10'$ Pa. In a case where the storage modulus of elasticity is $0.1 \times 10'$ Pa or more, aggregation fracture of the pressure sensitive adhesive hardly occurs and handling is easy. In a case where the storage modulus of elasticity is $1.3 \times 10'$ Pa or less, the pressure sensitive adhesive easily enters the gaps between the particles, and thus an effect of suppressing of aggregation of the particles may be easily obtained. Therefore, in a case where the storage modulus of elasticity is $1.2 \times 10^5$ Pa or less, it is possible to obtain the antireflection film having a satisfactory reflectivity.

The preferable range of the weight-average molecular weight of the sol component in the pressure sensitive adhesive in this case is as described above.

The film thickness of the layer (b) is preferably 0.1 μm to 50 μm, more preferably 1 μm to 30 μm, and even more preferably 1 μm to 20 μm.

The pressure sensitive adhesive preferably includes a polymer and more preferably includes a (meth)acrylic polymer. Particularly, a polymer (in a case where two or more kinds of monomers, a copolymer) of at least one monomer of (meth)acrylic acid alkyl ester monomers having an alkyl group of 1 to 18 carbon atoms is preferable. The weight-average molecular weight of the (meth)acrylic polymer is preferably 200,000 to 2,000,000.

Examples of the (meth)acrylic acid alkyl ester monomer in which an alkyl group has 1 to 18 carbon atoms include an alkyl (meth)acrylate monomer such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, cyclopentyl (meth)acrylate, cyclohexyl (meth)acrylate, isomyristyl (meth)acrylate, isocetyl (meth)acrylate, isostearyl (meth)acrylate, myristyl (meth)acrylate, cetyl (meth)acrylate, stearyl (meth)acrylate, tetradecyl (meth)acrylate, pentadecyl (meth)acrylate, hexadecyl (meth)acrylate, heptadecyl (meth)acrylate, and octadecyl (meth)acrylate. The alkyl group of the alkyl (meth)acrylate monomer may be linear, branched or cyclic. Two or more of the monomers may be used in combination.

Preferable examples of the (meth)acrylate monomer having an aliphatic ring include cyclopentyl (meth)acrylate, cyclohexyl (meth)acrylate, cycloheptyl (meth)acrylate, and isobornyl (meth)acrylate. Among these, cyclohexyl (meth)acrylate is particularly preferable.

The (meth)acrylic polymer is a copolymer including at least one of (meth)acrylic acid alkyl ester monomers having an alkyl group of 1 to 18 carbon atoms and at least one of other copolymerizable monomers. In this case, examples of the other copolymerizable monomers include a copolymerizable vinyl monomer containing at least one group selected from a hydroxyl group, a carboxyl group, and an amino group, a copolymerizable vinyl monomer having a vinyl group, and an aromatic monomer.

Examples of the copolymerizable vinyl monomer containing a hydroxyl group include hydroxyl group-containing (meth)acrylate esters such as 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, and 8-hydroxyoctyl (meth)acrylate, and hydroxyl group-containing (meth)acrylamides such as N-hydroxy (meth)acrylamide, N-hydroxymethyl (meth)acrylamide, and N-hydroxyethyl (meth)acrylamide, and the copolymerizable vinyl monomer is preferably at least one selected from the group of these compounds.

It is preferable that the content of the copolymerizable vinyl monomer containing a hydroxyl group is 0.1 to 15 parts by mass with respect to 100 parts by mass of the (meth)acrylic polymer.

Examples of the copolymerizable vinyl monomer containing a carboxyl group include (meth)acrylic acid, itaconic acid, crotonic acid, maleic acid, fumaric acid, carboxyethyl (meth)acrylate, and carboxypentyl (meth)acrylate, and at least one selected from the group of these compounds is preferable.

The content of the copolymerizable vinyl monomer containing a carboxyl group is preferably 0.1 to 2 parts by mass with respect to 100 parts by mass of the (meth) acrylic copolymer.

Examples of the copolymerizable vinyl monomer containing an amino group include monoalkylaminoalkyl (meth)acrylate such as monomethylaminoethyl (meth)acrylate, monoethylaminoethyl (meth)acrylate, monomethyl aminopropyl (meth)acrylate, and monoethylaminopropyl (meth)acrylate.

Examples of the aromatic monomer include styrene in addition to aromatic group-containing (meth)acrylate esters such as benzyl (meth)acrylate and phenoxyethyl (meth)acrylate.

Examples of the copolymerizable vinyl monomer other than the above include various vinyl monomers such as acrylamide, acrylonitrile, methyl vinyl ether, ethyl vinyl ether, vinyl acetate, and vinyl chloride.

The pressure sensitive adhesive may include a cured product of a composition (also referred to as a pressure sensitive adhesive composition) for forming the pressure sensitive adhesive.

The pressure sensitive adhesive composition preferably includes the polymer and the crosslinking agent, and may be crosslinked by heat, ultraviolet rays (UV), or the like. The crosslinking agent is preferably one or more crosslinking agents selected from a compound group consisting of a difunctional or higher functional isocyanate-based crosslinking agent, a difunctional or higher functional epoxy-based crosslinking agent, and an aluminum chelate-based crosslinking agent. In a case where a crosslinking agent is used, in the manufacturing the antireflection film according to the embodiment of the present invention, in view of causing the pressure sensitive adhesive component to hardly remain on the antireflection film surface, the content of the crosslinking agent is preferably 0.1 to 15 parts by mass, more preferably 3.5 to 15 parts by mass, even more preferably more than 3.5 parts by mass and less than 15 parts by mass, and particularly preferably 5.1 to 10 parts by mass with respect to 100 parts by mass of the polymer.

The difunctional or higher functional isocyanate-based compound may be a polyisocyanate compound having at least two isocyanate (NCO) groups in one molecule, and examples thereof include a burette-modified product and an isocyanurate-modified product of diisocyanates (compounds having two NCO groups in one molecule) such as hexamethylene diisocyanate, isophorone diisocyanate, diphenylmethane diisocyanate, tolylene diisocyanate, and xylylene diisocyanate, and an adduct (polyol modified product) with trivalent or higher valent polyols (compounds having at least three OH groups in one molecule) such as trimethylolpropane and glycerin.

A trifunctional or higher functional isocyanate-based compound is a polyisocyanate compound having at least three or more isocyanate (NCO) groups in one molecule, and particularly at least one or more selected from the compound group consisting of an isocyanurate body of a hexamethylene diisocyanate compound, an isocyanurate body of an isophorone diisocyanate compound, an adduct of hexamethylene diisocyanate compound, an adduct of isophorone diisocyanate compound, a burette body of a hexamethylene diisocyanate compound, and a burette body of an isophorone diisocyanate compound are preferable.

The difunctional or higher functional isocyanate-based crosslinking agent is contained in an amount of preferably 0.01 to 5.0 parts by mass and more preferably 0.02 to 3.0 parts by mass, with respect to 100 parts by mass of the polymer.

The pressure sensitive adhesive composition may contain an antistatic agent in order to provide antistatic performances. The antistatic agent is preferably an ionic compound and more preferably quaternary onium salt.

As the antistatic agent which is a quaternary onium salt, for example, an alkyldimethylbenzyl ammonium salt having an alkyl group having 8 to 18 carbon atoms, a dialkylmethylbenzyl ammonium salt having an alkyl group having 8 to 18 carbon atoms, a trialkylbenzyl ammonium salt having an alkyl group having 8 to 18 carbon atoms, a tetraalkyl ammonium salt having an alkyl group having 8 to 18 carbon atoms, an alkyldimethylbenzyl phosphonium salt having an alkyl group having 8 to 18 carbon atoms, a dialkylmethylbenzyl phosphonium salt having an alkyl group having 8 to 18 carbon atoms, a trialkylbenzyl phosphonium salt having an alkyl group having 8 to 18 carbon atoms, a tetraalkyl phosphonium salt having an alkyl group having 8 to 18 carbon atoms, an alkyl trimethyl ammonium salt having an alkyl group having 14 to 20 carbon atoms, and an alkyldimethyl ethyl ammonium salt having an alkyl group having 14 to 20 carbon atoms can be used. These alkyl groups may be alkenyl groups having an unsaturated bond.

As the antistatic agent, in addition to the above, nonionic, cationic, anionic, and amphoteric surfactants, ionic liquid, alkali metal salt, metal oxide, metal fine particles, a conductive polymer, carbon, a carbon nanotube can be used.

Examples of the alkali metal salt include metal salt including lithium, sodium, and potassium. In order to stabilize ionic substances, a compound containing a polyoxyalkylene structure may be added.

The antistatic agent preferably contains 0.1 to 10 parts by mass with respect to 100 parts by mass of the polymer.

The pressure sensitive adhesive composition can further contain a polyether-modified siloxane compound having HLB of 7 to 15 as an antistatic aid.

HLB is a hydrophilic-lipophilic balance (hydrophilic lipophilicity ratio) defined, for example, by JIS (Japanese Industrial Standard) K3211 (surfactant term) and the like.

The pressure sensitive adhesive composition can further contain a crosslinking accelerator. In a case where a polyisocyanate compound is used as a crosslinking agent, the crosslinking accelerator may be a substance, functioning as a catalyst for the reaction (crosslinking reaction) between the copolymer and the crosslinking agent, and examples thereof include an amine-based compound such as tertiary amine, and an organometallic compound such as a metal chelate compound, an organotin compounds, an organic lead compound, organozinc compound. According to the present invention, the crosslinking accelerator is preferably a metal chelate compound or an organotin compound.

The content of the crosslinking accelerator is preferably 0.001 to 0.5 parts by mass with respect to 100 parts by mass of the copolymer.

It is preferable that, the laminate of the present invention has three or more crosslinking groups in one molecule on the surface of the layer (b) of the layer (ca) side, a crosslinking group equivalent is 450 or less, and a lubricant (hereinafter also referred to as a "lubricant a") having a low friction portion consisting of fluorine or silicone is present.

In a case where the lubricant a is present on the surface of the layer (b) on the layer (ca) side, in the manufacturing of the antireflection film according to the embodiment of the present invention, it is possible to effectively prevent the pressure sensitive adhesive in the layer (b) from remaining on (transferred to) the surface of the antireflection film.

<Support>

The support in the pressure sensitive film is described.

As the support, a plastic film formed of a resin having transparency and flexibility is preferably used. Preferable examples of the plastic film for the support include a film formed of a polyester film such as polyethylene terephthalate, polyethylene naphthalate, polyethylene isophthalate, and polybutylene terephthalate, a (meth)acrylic resin, a polycarbonate-based resin, a polystyrene-based resin, a polyolefin-based resin, a cyclic polyolefin-based resin, and a cellulose-based resin such as cellulose acylate. Here, the (meth)acrylic resin is preferably a polymer having a lactone ring structure, a polymer having a glutaric anhydride ring structure, and a polymer having a glutarimide ring structure.

Other plastic films can be used as long as the plastic films have required strength and optical suitability. The support may be an unstretched film or may be uniaxially or biaxially stretched. Otherwise, the support may be a plastic film in which an angle of the axis method formed according to the stretching ratio and stretching crystallization is controlled.

As the support, those having ultraviolet permeability are preferable. It is preferable to have ultraviolet permeability in view of manufacturing suitability, since in the steps (4-2) and (7), ultraviolet irradiation from the support side can be performed in a case of curing the layer (ca).

Specifically, the maximum transmittance of the support at the wavelength of 250 nm to 300 nm is preferably 20% or more, more preferably 40% or more, and particularly preferably 60% or more. It is preferable that the maximum transmittance at the wavelength of 250 nm to 300 nm is 20% or more, since the layer (ca) can be easily cured by being irradiated with ultraviolet rays from the support side.

Specifically, the maximum transmittance of the pressure sensitive film in which the layer (b) is formed on the support at the wavelength of 250 nm to 300 nm is preferably 20% or more, more preferably 40% or more, and particularly preferably 60% or more.

The film thickness of the support is not particularly limited, but is preferably 10 µm to 100 µm, more preferably 10 µm to 50 µm, and even more preferably 10 µm to 40 µm.

As the pressure sensitive film obtained by forming the layer (b) on the support, a commercially available protective film can be suitably used. Specific examples thereof include AS3-304, AS3-305, AS3-306, AS3-307, AS3-310, AS3-04421, AS3-0520, AS3-0620, LBO-307, NBO-0424, ZBO-0421, S-362, and TFB-4T3-367AS manufactured by Fujimori Kogyo Co., Ltd.

In the steps (4-2) and (7), the layer (ca) is cured while a state in which the particles (a2) are buried in the layer obtained by combining the layer (ca) and the layer (b) is maintained, but in the stage before the step (4-2) (that is, after the step (4) is completed), it is preferable to have an uneven shape formed by the particles (a2) protruding from the interface of the layer (ca) on the support side. In this manner, in a case where the layer (b) is peeled off in the step (8) after the layer (ca) is cured in the step (7), it is possible to obtain the antireflection film in a state in which the particles (a2) protrude on the surface of the layer (a).

In the stage before the step (4-2), in order to provide an uneven shape formed by the particles (a2) protruding from the interface of the layer (ca) on the support side, in the step (4), it is preferable to cause a portion of the curable compound (a1) to permeate the layer (b).

[Step (4)]

The step (4) is a step of burying the particles (a2) in the layer obtained by combining the layer (ca) and the layer (b) and causing a position of the interface (preferably an interface of the layer (ca) and the layer (b)) of the layer (ca) on the support side to be close to the temporary support side so as to protrude from the interface of the layer (ca) on the support side.

The expression "burying the particles (a2) in the layer obtained by combining the layer (ca) and the layer (b) and protruding from the interface of the layer (ca) on the support side" is, in other words, "causing the particles (a2) not to be exposed from the layer obtained by combining the layer (ca) and the layer (b) and to be present across both layers of the layer (ca) and the layer (b) (the particles (a2) are present across the interface between the layer (ca) and the layer (b))".

It is preferable that the step (4) is performed by causing a portion of the curable compound (a1) to permeate the layer (b).

In step (4), in a case where a portion of compound (a1) is caused to permeate the layer (b), the laminate after the step (3) is completed is maintained preferably at less than 60° C. and more preferably at 40° C. or less. By maintaining the temperature at 40° C. or less, the viscosity of the curable compound (a1), the compound (a1c), and pressure sensitive adhesive can be maintained to be high, and at the same time, the thermal motion of the particles (a2) can be suppressed, and thus has a high effect of suppressing the decrease of the antireflection performances due to aggregation of the particles (a2) and the increase of the haze or the muddiness. The lower limit of the temperature at which the laminate is maintained is not particularly limited, and may be the room temperature or a temperature lower than the room temperature.

[Step (4-2)]

The step (4-2) is a step of curing a portion of the layer (ca) in a state in which the particles (a2) are buried in the layer obtained by combining the layer (ca) and the layer (b), and specifically, curing a portion of the compound selected from the group consisting of the curable compound (a1) and the compound (a1c) in the layer (ca).

Curing a portion of the layer (ca) refers to curing only a portion, not all of the curable compound (a1) and the compound (a1c) in the layer (ca). Accordingly, it is possible to form a binder resin in the antireflection layer of the antireflection film. By causing the uncured curable compound (a1) to remain in the layer (ca) after the completion of the step (4-2), in the step (6) described below, bonding and adhesion between the layer (ca) and the substrate becomes possible.

In the step (4-2), since a state in which the particles (a2) are buried in the layer obtained by combining the layer (ca) and the layer (b) is maintained, the aggregation of the particles (a2) are suppressed and the moth eye structure can be formed.

In a case where it is considered that the state in which the particles (a2) are buried in the layer obtained by combining the layer (ca) and the layer (b) cannot be maintained due to the volatilization of the component of the layer (b) or the layer (ca) after the layer (b) is provided, an operation of thickening the layer (b) in advance or the like can be performed.

In the step (4-2), the curing can be performed by irradiation with ionizing radiation. The kind of ionizing radiation is not particularly limited, and examples thereof include X-rays, electron beams, ultraviolet rays, visible light, and infrared rays. However, ultraviolet light is widely used. For example, in a case where the coating film is ultraviolet curable, it is preferable that a portion of the curable compound (a1) in the layer (ca) is cured by being irradiated with ultraviolet rays in an irradiation amount of 10 mJ/cm$^2$ to 1,000 mJ/cm$^2$ by an ultraviolet lamp. In a case where the irradiation amount of the ultraviolet rays is 10 mJ/cm$^2$ or more, the adhesion force between the layer (b) and a portion including the particles (a2) and the layer (ca) becomes appropriately strong, the particles (a2) and the layer (ca) hardly remains on the temporary support in the step (5) of peeling the temporary support, and defects (regions in which the reflectivity decreases) are less likely to occur in the obtained antireflection film. In a case where the irradiation amount of the ultraviolet rays is 1,000 mJ/cm$^2$ or less, a residual amount of the curable compound (a1) in the layer (ca) after the completion of the step (4-2) does not decrease too much, and an appropriate adhesion force between the layer (ca) and the substrate in the step (6) can be obtained. The irradiation amount in the step (4-2) is not particularly limited, and can be appropriately adjusted considering the adhesion force between the used layer (b) and the used portion including the particles (a2) and the layer (ca) and the adhesion force between the layer (ca) and the substrate. At the time of irradiation, the energy may be applied at once or can be applied in a divided manner. As the ultraviolet lamp type, a metal halide lamp, a high pressure mercury lamp, or the like is suitably used.

The oxygen concentration at the curing in the step (4-2) is preferably 0 to 1.0 vol %, more preferably 0 to 0.1 vol %, and particularly preferably 0 to 0.05 vol %. In a case where the oxygen concentration at curing is smaller than 1.0 vol %, curing inhibition caused by oxygen is hardly received, and the film becomes strong.

In the step (4-2), in a case where the portion of the compound selected from the group consisting of the curable compound (a1) and the compound (a1c) in the layer (ca) is cured, the layer (ca) side of the support may be irradiated with ultraviolet rays from the opposite side or may be irradiated with ultraviolet rays from the temporary support side.

[Step (5)]

The step (5) is a step of peeling the temporary support from the laminate after the completion of the step (4) or (4-2).

In order to peel off the temporary support from the laminate after the completion of the step (4) or (4-2), it is preferable that appropriately adhesion force is applied between the layer (ca) and the temporary support, and a portion (which is a portion including the particles (a2) represented by reference numeral 3 and the layer (ca) represented by reference numeral 4 in FIG. 1, and a portion corresponding to the antireflection layer 2 of FIG. 2) including the layer (ca) and the particles (a2) is in a state of being capable of being transferred to the pressure sensitive film. For example, a portion including the layer (ca) and the particles (a2) is not detached from the temporary support in the bending or transport tension of the laminate during the manufacturing process, but, it is preferable that, in a case of being brought into contact with the layer (b) or in a case of being brought into contact with the layer (b) and performing ultraviolet radiation, a portion including the layer (ca) and the particles (a2) is detached.

A laminate obtained completing the step (5) is a laminate of the present invention.

In the steps (2), (3), (4), (4-2), and (5), it is preferable that a plurality of particles (a2) are not present in a direction orthogonal to the surface of the layer (ca).

Here, the expression "the plurality of particles (a2) are not present in the direction orthogonal to the surface of the layer (ca)" indicates that, in a case where 10 μm×10 μm of the in-plane of the layer (ca) is observed with three visual fields with a scanning electron microscope (SEM), the proportion of the number of particles (a2) in a state in which a plurality of the particles are not present in the direction orthogonal to the surface is 80% or more and preferably 95% or more.

In steps (4), (4-2), and (5), the total film thickness of the layer (ca) and the layer (b) is preferably more than the average primary particle diameter of the particles (a2).

It is preferable that the total film thickness of the film thickness of the layer (ca) and the film thickness of the layer (b) is more than the average primary particle diameter of the particles (a2), since it is possible to cause the particles (a2) to be buried in the layer obtained by combining the layer (ca) and the layer (b).

In the steps (4), (4-2), and (5), the film thickness of the layer (ca) is preferably 5% to 70% and more preferably 20% to 40% of the average primary particle diameter of the particles (a2). It is preferable that the film thickness of the layer (ca) is 5% or more of the average primary particle diameter of the particles (a2), since the particles (a2) are hardly separated from the antireflection film that can be obtained after the pressure sensitive film is peeled off in the step (8) described below, and the portion including the layer (ca) and the particles (a2) is transferred to the substrate, and the scratch resistance is improved. In a case where the film thickness of the layer (ca) is 70% or less of the average primary particle diameter of the particles (a2), the inclination of the refractive index is sufficient, and sufficient antireflection properties can be obtained. It is preferable that the film thickness of the layer (ca) is 20% to 40% of the average primary particle diameter of the particles (a2), since both of the sufficient scratch resistance and the sufficient antireflection performance can be obtained. The same is applied in the steps (6) to (10) below.

It is preferable that the film thickness of the layer (ca) after the completion of the step (5) is adjusted so as to be 10 nm to 100 nm (more preferably 20 nm to 90 nm and even more preferably 30 nm to 70 nm) in a case where a film cross section of the layer (ca) is observed, with a scanning electron microscope (SEM), and film thicknesses at any 100 portions are measured, and the average value thereof is obtained.

It is preferable that in the layer (b) side of the layer (ca) in the laminate which can be obtained by the completion of the step (5), the particles (a2) do not protrude from the surface on the opposite side.

The surface roughness of the surface of the layer (ca) on the opposite side to the layer (b) in the laminate which can be obtained by the completion of the step (5) is preferably 30 nm or less and more preferably 10 nm or less.

In a case where the surface roughness of the surface of the layer (ca) on the opposite side to the layer (b) is 30 nm or less, the particles (a2) do not protrude from the surface of the layer (ca) on the opposite side to the layer (b), and in a case where the pressure sensitive film is peeled off in the step (8) described below and a portion (antireflection layer) including the layer (ca) and the particles (a2) is transferred to the substrate, the portion is easily transferred, and defects are generated on the antireflection film layer after the transfer. It is preferable that the surface roughness of the surface of the layer (ca) on the opposite side of the layer (b) is 10 nm or less, since, in a case where the layer (ca) and the substrate are bonded to each other in the step (6), satisfactory adhesive can be secured, and the generation of cavities between the transferring layer (the portion including the particles (a2) and the layer (ca)) and the substrate which occurs the increase of the haze of the antireflection film can be suppressed.

In the present invention, the surface roughness is measured by SPA-400 (manufactured by Hitachi High-Tech Science Corporation) under measurement conditions of a measurement range 5 µm×5 µm, a measurement mode of DFM, and a measurement frequency of 2 Hz.

The portion including the particle (a2) and the layer (ca) in the laminate which can be obtained by the completion of the step (5) is peeled off from the layer (b) of the pressure sensitive film.

The fact that the portion including the particles (a2) and the layer (ca) can be peeled off from the layer (b) of the pressure sensitive film means that, an adhesion force is appropriately applied between the portion including the particles (a2) and the layer (ca) and the layer (b) of the pressure sensitive film, and thus a portion including the particles (a2) and the layer (ca) in the transferring step (the step (8)) described below is in a state of being detached from the surface of the layer (b) and transferred to the substrate surface. The fact that the portion (antireflection layer) including the particles (a2) and the layer (ca) can be transferred to the substrate surface, that is, has transferability means that, in a case where a black polyethylene terephthalate sheet with a pressure sensitive adhesive (manufactured by Tomoegawa Co., Ltd.; "clearly seen") is bonded to an opposite side to the transfer surface (a surface having an antireflection layer) of the transferred antireflection film and is visually observed, a proportion of an region in which reflectivity decreases more than that before an antireflection layer is transferred is 80% or more with respect to the transferred area. The adhesion force between the portion including the particles (a2) and the layer (ca) and the layer (b) is not particularly limited, but, for example, the adhesion force can be measured by an adhesion force in a case where the portion including the particles (a2) of the transfer member (the laminate that can be obtained by the completion of the step (5)) having a width of 25 mm and the layer (ca) is fixed to a glass substrate having a thickness of 1.1 mm by using an adhesive, and the portion including the particles (a2) and the layer (ca) and the layer (b) are peeled off from each other in the 90° direction and the speed of 1,000 mm/min. It is preferable that the peeling force measured by the method is preferably 0.2 N/25 mm to 4.0 N/25 mm and more preferably 0.6 N/25 mm to 4.0 N/25 mm. In a case where the peeling force is 0.6 N/25 mm or more, in the step (5), in a case where the temporary support is peeled off, the portion of the particles (a2) and the layer (ca) hardly remains on the temporary support, and thus the reflectivity of the finally obtained antireflection film and the haze decrease. In a case where the peeling force is 4.0 N/25 mm or less, in the step (8), in a case where the pressure sensitive film is peeled off, a portion of the particles (a2) hardly remains on the layer (b), and thus the reflectivity and the haze of the finally obtained antireflection film decrease.

In the laminate obtained by the completion of the step (5), a value (Δhaze) obtained by subtracting the haze of the portion obtained by removing the portion including the particles (a2) and the layer (ca) from the laminate from the total haze of the laminate is preferably 1.00% or less.

The haze can be measured with a film sample of 40 mm×80 mm at 25° C. at a relative humidity of 60° % with a haze meter NDH4000 manufactured by Nippon Denshoku Industries Co., Ltd. according to JIS-K7136 (2000).

Δhaze may have a negative value. Δhaze is preferably 1.00% or less, more preferably 0.80% or less, and even more preferably 0.40% or less. In a case where Δhaze is 1.00% or less, the haze of the antireflection film obtained by using the laminate obtained by the completion of the step (5) decreases, and thus it becomes possible to obtain satisfactory antireflection properties. In a case where Δhaze is 0.40)% or less, in a case where a black polyethylene terephthalate sheet with a pressure sensitive adhesive (manufactured by Tomoegawa Co., Ltd.; "clearly seen") is bonded to an opposite side to the transfer surface of the antireflection film obtained by using the laminate obtained by the completion of the step (5), it is possible to obtain an excellent antireflection film having no antireflection film caused by the haze.

[Step (6)]

The step (6) is a step of bonding the layer (ca) and the substrate in the laminate obtained by the method of manufacturing the laminate according to the embodiment of the present invention.

The method of bonding the layer (ca) and the substrate is not particularly limited, and well-known methods may be used. Examples thereof include a roll lamination method.

It is preferable to bond a pressure sensitive film such that the layer (ca) and the substrate are in contact with each other.

(Substrate)

The substrate is not particularly limited, as long as the substrate is a substrate having light transmittance that is generally used as a substrate of an antireflection film, but a plastic substrate or a glass substrate is preferable.

As the plastic substrate, various kinds thereof can be used. Examples thereof include a substrate containing a cellulose-based resin; cellulose acylate (triacetate cellulose, diacetyl cellulose, and acetate butyrate cellulose) and the like; a polyester resin; polyethylene terephthalate and the like, a (meth)acrylic resin, a polyurethane-based resin, polycarbonate, polystyrene, an olefin-based resin, and the like. A substrate containing cellulose acylate, polyethylene terephthalate, or a (meth)acrylic resin is preferable, a substrate containing cellulose acylate is more preferable, and a cellulose acylate film is particularly preferable. As the cellulose acylate, substrates and the like disclosed in JP2012-093723A can be preferably used.

The thickness of the plastic substrate is usually about 10 μm to 1,000 μm. However, in view of satisfactory handleability, high light transmittance, and sufficient strength, the thickness is preferably 20 μm to 200 μm and more preferably 20 μm to 100 μm. As the light transmittance of the plastic substrate, those having light transmittance of the visible light of 90% or more are preferable.

According to the present invention, before the step (6), a functional layer may be provided on the substrate. In a case where a functional layer is provided on the substrate, for convenience, a laminate of the functional layer and the substrate is called a "substrate". In a case where a functional layer is provided on the substrate, the functional layer and the layer (ca) are bonded to each other in the step (6) and subsequent steps are performed. As the functional layer, a hard coat layer is preferable.

[Step (7)]

The step (7) is a step of curing the layer (ca) in a state in which the particles (a2) are buried in the layer obtained by combining the layer (b) and the layer (ca), and specifically, a step of curing a portion or all of the compound selected from the group consisting of the curable compound (a1) and the compound (a1c) in the layer (ca). Curing all of the compound selected from the group consisting of the curable compound (a1) and the compound (a1c) in the layer (ca) includes a case where an uncured compound remains in a case where curing is performed in a general method. The curing rate in the step (7) is not particularly limited, but in view of the film hardness, the curing rate is preferably 60% or more and more preferably 80% or more.

In the step (7), the substrate bonded in the step (6) and the layer (ca) can adhere to each other.

The curing in the step (7) is preferably performed in the same conditions as the conditions described in the step (4-2).

[Step (8)]

The step (8) is a step of peeling a pressure sensitive film from the laminate obtained from the step (7).

In order to peel the pressure sensitive film in the step (8), as an index of the adhesion force between the portion including the particles (a2) and the layer (ca) and the layer (b) in the laminate obtained by the completion of the step (5), the peeling force measured in the above measuring method is preferably 0.2 N/25 mm to 4.0 N/25 mm.

It is possible to obtain an antireflection film having a moth eye structure including an unevenness shape formed by the particles (a2) on the surface of the layer (ca) after the completion of the step (8), but the steps (9) and (10) may be performed afterwards.

[Step (9)]

The step (9) is a step of curing the layer (ca) in a state in which the particles (a2) protrude from the interface of the layer (ca) on the opposite side to the interface on the substrate side, and specifically, a step of curing all of the curable compound (a1) and the compound (a1c) in the layer (ca). In a case where all of the curable compound (a1) and the compound (a1c) in the layer (ca) are cured in the step (7) described above, the step (9) may not be performed.

It is preferable that the curing in the step (9) is performed in the same conditions as the conditions as described in the step (4-2).

In the step (9), it is preferable that irradiation was performed with ultraviolet rays from the opposite side of the layer (ca) to the substrate side, to cure the curable compound (a1) and the compound (a1c) in the layer (ca), in view of manufacturing suitability.

The layer (ca) after the completion of the step (9) is a layer including the compound (a1c) in the layer. Here, as described above, in a case where curing is performed by the general method, an uncured compound may remain.

[Step (10)]

The step (10) is a step of washing the laminate after the completion of the step (9) with a solvent.

In the manufacturing of the antireflection film using the laminate according to the embodiment of the present invention, the pressure sensitive adhesive hardly remains on the layer (ca) side even in a case where the support and the layer (b) are peeled off, but in the step (10), washing may be performed with a solvent (such as methyl isobutyl ketone, methyl ethyl ketone, and acetone) that dissolves the pressure sensitive adhesive, without dissolving the substrate and the layer (ca).

[Laminate]

As described above, the laminate according to the embodiment of the present invention is a laminate having a support, the layer (b) including a pressure sensitive adhesive, the particles (a2) having an average primary particle diameter of 100 nm to 380 nm, and the layer (ca) including a resin, in which the layer (b) is provided closer to the support than the layer (ca), the particles (a2) are buried in the layer obtained by combining the layer (b) and the layer (ca) and protrude from the interface of the layer (ca) on the support side, and the portion including the particles (a2) and the layer (ca) can be peeled off from the layer (b).

The layer (ca) including a resin corresponds to the layer (ca) after the step (5) in the method of manufacturing the laminate according to the embodiment of the present invention, and the resin corresponds to the compound (a1c) obtained by curing the curable compound (a1) included in the layer (ca) of the step (5).

With respect to the laminate according to the embodiment of the present invention, it is preferable that a value obtained by subtracting the haze of the portion obtained by removing the portion including the particles (a2) and the layer (ca) from the laminate from the total haze of the laminate is 1.00% or less, in view of manufacturing an antireflection film having a low haze and excellent antireflection properties.

In view of transportability and rollability, the laminate according to the embodiment of the present invention may further have a peelable member (separator) on a surface of the layer (ca) on the opposite side to the layer (b) for protecting the surface of the layer (ca).

The above separator is not particularly limited, as long as the separator has a material of capable of being peeled off from the laminate according to the embodiment of the present invention, but a member which is the same as the temporary support can be used, or the temporary support itself may be used as the separator.

In the laminate according to the embodiment of the present invention, it is preferable that the height of the interface of the layer (ca) on the support side is a half or less of the average primary particle diameter of the particles (a2) with an interface on the opposite side as a starting point.

In the laminate according to the embodiment of the present invention, the film thickness of the layer (ca) is preferably 5% to 70% and more preferably 20% to 40% of the average primary particle diameter of the particles (a2).

With respect to the surface on the layer (ca) side in the laminate according to the embodiment of the present invention, the surface roughness thereof is preferably 30 nm or less and more preferably 10 nm or less.

It is preferable that the laminate according to the embodiment of the present invention is a laminate in which the portion including the particles (a2) and the layer (ca) can be peeled off from the layer (b), and the peeling force measured by the above measurement method is 0.2 N/25 mm to 4.0 N/25 mm.

In addition, descriptions, specific examples, and preferable ranges of respective layers and respective components in the laminate of the present invention are the same as those described in the method of manufacturing the laminate of the present invention.

[Antireflection Film]

Figure 3:
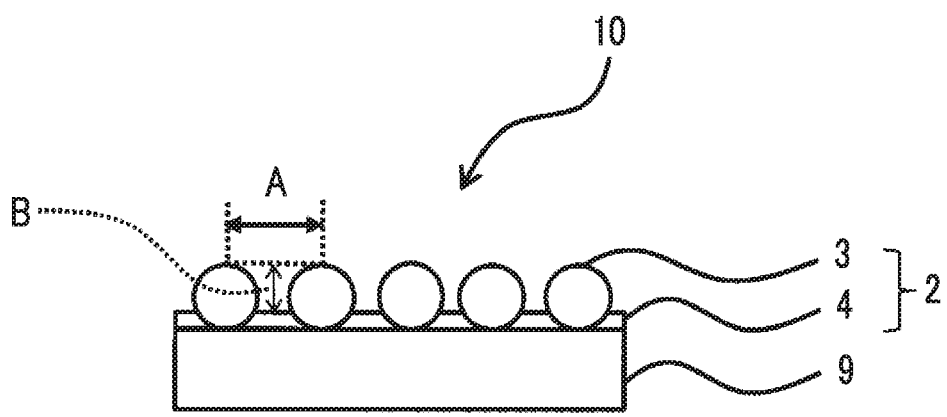
FIG. 3 is a schematic cross-sectional view illustrating an example of an antireflection film manufactured by the manufacturing method according to the embodiment of the present invention.

An example of a preferable embodiment of an antireflection film obtained by the manufacturing method of the present invention is illustrated in FIG. 3.

The antireflection film 10 in FIG. 3 has the substrate 9 and the antireflection layer 2. The antireflection layer 2 includes the particles (a2) (reference numeral 3) and the binder resin film (reference numeral 4) which is the layer (ca). The particles 3 protrude from the binder resin film 4 to form a moth eye structure.

(Moth Eye Structure)

The moth eye structure refers to a surface obtained by processing of a substance (material) for suppressing reflection of light and a structure of having a periodic microstructure pattern. Particularly, in a case of having the purpose of suppressing reflection of visible light, the moth eye structure refers to a structure having a microstructure pattern with a period of less than 780 nm. It is preferable that the period of the microstructure pattern is less than 380 nm, the color of reflected light becomes small. It is preferable that the period of the uneven shape of the moth eye structure is 100 nm or more, light having a wavelength of 380 nm can recognize a microstructure pattern and is excellent in antireflection properties. Whether the moth eye structure is present can be checked by observing the surface shape with a scanning electron microscope (SEM)), an atomic force microscope (AFM) or the like, and checking whether the microstructure pattern can be formed.

In the uneven shape the antireflection layer of the antireflection film manufactured by the manufacturing method of the present invention, it is preferable that B/A which is the ratio of a distance A between the peaks of the adjacent protrusions and a distance B between the center between the peaks of the adjacent protrusions and the recessed part is 0.4 or more. In a case where B/A is 0.4 or more, the refractive index gradient layer in which the depth of the recessed part is greater than the distance between the protrusions and the refractive index gradually changes from the air to the inside of the antireflection layer can be formed, and thus the reflectivity can be further reduced.

B/A is more preferably 0.5 or more. In a case where B/A is 0.5 or more, the distance A between the peaks of the adjacent protrusions (protrusions formed by the particles) becomes the particle diameter or more, such that the recessed part is formed between particles. As a result, it is assumed that, in a case where both of the interface reflection due to a region having a sharp change on the refractive index depending on the curvature of the upper side of the protrusion and the interface reflection due to a region having a sharp change on the refractive index depending on the curvature of the recessed part between the particles are present, in addition to the refractive index gradient layer effect by the moth eye structure, the reflectivity is more effectively reduced.

B/A can be controlled by the volume ratio of the binder resin and the particles in the antireflection layer after curing. Therefore, it is important to appropriately design the formulation ratio of the binder resin and the particles. In a case where the binder resin permeates the layer (b) including the pressure sensitive adhesive in the step of preparing the moth eye structure or volatilizes, the volume ratio of the binder resin and the particles in the antireflection layer becomes different from the formulation ratio in the composition for forming the antireflection layer, and thus it is important to appropriately set the matching with the layer (b) including the pressure sensitive adhesive in the laminate according to the embodiment of the present invention.

In order to realize the low reflectivity and suppress the occurrence of haze, it is preferable that the particles for forming the protrusions are uniformly spread at an appropriate filling rate. In view of the above, the content of the particles (a2) for forming the protrusions is preferably adjusted such that the inorganic particles are uniform over the entire antireflection layer. The filling rate can be measured as the area occupation ratio (particle occupancy ratio) of the inorganic particles located most surface side in a case of observing the particles (a2) forming the protrusions from the surface by scanning electron microscope (SEM) or the like, and is 25% to 64%, preferably 25% to 50%, and more preferably 30% to 45%.

The uniformity of the surface of the antireflection film can be evaluated by haze. With respect to the measurement, a film sample of 40 mm×80 mm can be measured according to JIS-K 7136 (2000) with a haze meter NDH 4000 manufactured by Nippon Denshoku Industries Co., Ltd. at 25° C. and a relative humidity of 606. In a case where particles aggregated and were not uniform, the haze was high. It is preferable that the haze was lower. The value of the haze is preferably 0.0% to 3.0%, more preferably 0.0% to 2.5%, and even more preferably 0.0% to 2.0%.

[Hard Coat Layer]

According to the present invention, a hard coat layer can further be provided between the substrate and the layer (ca). In the case where the hard coat layer is provided on the substrate, as described above, according to the present invention, the hard coat layer on the substrate is collectively referred to as the substrate in some cases.

The hard coat layer is preferably formed by a crosslinking reaction or a polymerization reaction of a curable compound (preferably an ionizing radiation curable compound) which is a compound having a polymerizable group. For example, the hard coat layer can be formed by coating the substrate with a coating composition including an ionizing radiation curable polyfunctional monomer or a polyfunctional oligomer and subjecting the polyfunctional monomer or the polyfunctional oligomer to crosslinking reaction or polymerization reaction.

As the functional group (polymerizable group) of the ionizing radiation curable polyfunctional monomer or polyfunctional oligomer, those having light, electron beams, or radiation polymerizability are preferable. Among them, a photopolymerizable functional group is preferable.

Examples of the photopolymerizable functional group include unsaturated polymerizable functional groups such as a (meth)acryloyl group, a vinyl group, a styryl group, and an allyl group. Among them, a (meth)acryloyl group is preferable.

Specifically, a compound which is the same as the curable compound (a1) described above can be used.

In view of applying sufficient durability and impact resistance in a film the thickness of the hard coat layer is usually about 0.6 μm to 50 μm and preferably 4 μm to 20 μm.

The strength of the hard coat layer is preferably H or more and more preferably 2H or more in a pencil hardness test. Further, in the Taber test according to JIS K5400, it is more preferable in a case where an abrasion amount of a test piece before and after the test is smaller.

The hard coat layer according to the present invention may include cellulose acylate in a region within 1 pin in the film thickness direction from the interface with the antireflection layer.

As the cellulose acylate, substrates and the like disclosed in <0072> to <0084> of JP2012-093723A can be preferably used.

The hard coat layer including cellulose acylate in a region within 1 μm from the interface with the antireflection layer in the film thickness direction can be formed, for example, by coating a substrate (a cellulose acylate film or the like) including cellulose acylate with a composition for forming a hard coat layer having permeability to the substrate and containing a solvent and a curable compound, causing the curable compound permeate the substrate, and curing the composition. The hard coat layer can also be formed by mixing and curing cellulose acylate and the curable compound.

In a case where the antireflection film is cut with a microtome and the cross section was analyzed with a time-of-flight secondary ion mass spectrometer (TOF-SIMS), the hard coat layer can be measured as a portion a cured product of cellulose acylate and the ionizing radiation curable compound is detected, and the film thickness of this region can also be measured from the cross-sectional information of the TOF-SIMS in the same manner.

The hard coat layer can be measured, for example, by detecting another layer between the substrate and the antireflection layer by observing the cross section by a reflection spectroscopic film thickness meter or a transmission electron microscope (TEM) by using light interference. As the reflective spectroscopic film thickness meter, FE-3000 (manufactured by Otsuka Electronics Co., Ltd.) or the like can be used.

According to the present invention, for example, in a case where the coating film is ultraviolet curable, the hard coat layer can be half-cured by appropriately adjusting the oxygen concentration in a case of curing and the ultraviolet irradiation amount. It is preferable that the coating film is cured by being irradiated with ultraviolet rays in an irradiation amount of 1 mJ/cm$^2$ to 300 mJ/cm$^2$ by an ultraviolet lamp. The irradiation amount is more preferably 5 mJ/cm$^2$ to 100 mJ/cm$^2$ and still more preferably 10 mJ/cm$^2$ to 70 mJ/cm$^2$. At the time of irradiation, the energy may be applied at once or can be applied in a divided manner. As the ultraviolet lamp type, a metal halide lamp, a high pressure mercury lamp, or the like is suitably used.

The oxygen concentration at the curing is preferably 0.05 to 5.0 vol %, more preferably 0.1 to 2 vol %, and particularly preferably 0.1 to 1 vol %.

(Solvent Having Permeability to Cellulose Acylate)

The composition for forming the hard coat layer preferably contains a solvent (also referred to as "permeable solvent") having permeability to cellulose acylate.

The solvent having permeability with respect to cellulose acylate is a solvent having solubility to a substrate (cellulose acylate substrate) containing cellulose acylate.

Here, the solvent having solubility to a cellulose acylate substrate means a solvent in which, after the cellulose acylate substrate having a size of 24 mm×36 mm (thickness: 80 μm) is immersed in a 15 ml bottle including the above solvent at room temperature (25° C.) for 60 seconds and then taken out, in a case where the immersed solution is subjected to gel permeation chromatography (GPC), the peak surface area of cellulose acylate is 400 mV/sec or more. Otherwise, the solvent means a solvent of which the shape thereof is lost by causing a cellulose acylate substrate having a size of 24 mm×36 mm (thickness 80 μm) to stand in a 15 ml bottle including the above solvent at room temperature (25° C.) for 24 hours and appropriately shaking the bottle or the like such that the cellulose acylate substrate is completely dissolved and which has solubility to the cellulose acylate substrate.

As the permeable solvent, methyl ethyl ketone (MEK), dimethyl carbonate, methyl acetate, acetone, methylene chloride, and the like can be preferably used, but the present invention is not limited thereto. Methyl ethyl ketone (MEK), dimethyl carbonate, and methyl acetate are more preferable.

The composition for forming a hard coat layer may include a solvent in addition to the permeable solvent (for example, ethanol, methanol, 1-butanol, isopropanol (IPA), methyl isobutyl ketone (MIBK), and toluene).

In the composition for forming a hard coat layer, the content of the permeable solvent is preferably 50 mass % to 100 mass % and more preferably 70 mass % to 100 mass % with respect to the total mass of the solvent included in the composition for forming a hard coat layer.

The solid content concentration of the composition for forming a hard coat layer is preferably 20 mass % to 70 mass % and more preferably 30 mass % to 60 mass %.

(Other Components)

In addition to the above components, a solvent, a polymerization initiator, an antistatic agent, an antiglare agent and the like can be appropriately added to the composition for forming a hard coat layer. Various additives such as reactive or non-reactive leveling agents and various sensitizing agents may be mixed.

(Polymerization Initiator)

If necessary, radicals and cationic polymerization initiators and the like may be suitably selected to be used. These polymerization initiators are decomposed by light irradiation and/or heating to generate radicals or cations and promote radical polymerization and cationic polymerization.

(Antistatic Agent)

As specific examples of the antistatic agent, antistatic agents well known in the related art such as quaternary ammonium salt, a conductive polymer, and a conductive fine particles can be used, though the antistatic agents are particularly limited. However, in view of the low cost and the ease of handling, an antistatic agent having quaternary ammonium salt is preferable.

(Refractive Index Adjusting Agent)

For the purpose of controlling the refractive index of the hard coat layer, a high refractive index monomer or inorganic particles can be added as a refractive index adjusting agent. In addition to the effect of controlling the refractive index, the inorganic particles also have an effect of suppressing curing shrinkage due to the crosslinking reaction. According to the present invention, after the hard coat layer is formed, a polymer generated by polymerizing the polyfunctional monomer and/or the high refractive index monomer or the like and inorganic particles dispersed therein are collectively referred to as a binder.

(Leveling Agent)

As specific examples of the leveling agent, leveling agents well-known in the related art such as fluorine-based or silicone-based leveling agents can be used. The composition for forming a hard coat layer to which the leveling agent is added can provide coating stability to the surface of the coating film in a case of coating or drying.

The antireflection film manufactured by the manufacturing method of the present invention can be appropriately used as a polarizing plate protective film.

The polarizing plate protective film using the antireflection film manufactured by the manufacturing method of the present invention can be bonded to a polarizer to form a polarizing plate and can be appropriately used in a liquid crystal display device or the like.

[Polarizing Plate]

The polarizing plate is a polarizing plate having a polarizer and at least one of the protective films for protecting the polarizer, and it is preferable that at least one of the protective films is an antireflection film manufactured by the method for manufacturing the antireflection film of the present invention.

The polarizer includes an iodine-based polarizer, a dye-based polarizer using a dichroic dye, and a polyene-based polarizer. The iodine-based polarizer and the dye-based polarizer can be generally manufactured by using a polyvinyl alcohol-based film.

[Cover Glass]

The antireflection film manufactured by the method for manufacturing an antireflection film of the present invention can also be applied to a cover glass.

[Image Display Device]

The antireflection film manufactured by the method for manufacturing an antireflection film of the present invention can also be applied to an image display device.

Examples of the image display device include a display device using a cathode ray tube (CRT), a plasma display panel (PDP), an electroluminescent display (ELD), a vacuum fluorescent display (VFD), a field emission display (FED), and a liquid crystal display device (LCD), and a liquid crystal display device is particularly preferable.

Generally, a liquid crystal display device has a liquid crystal cell and two polarizing plates disposed on both sides of the liquid crystal cell, and the liquid crystal cell carries a liquid crystal between the two electrode substrates. One optically anisotropic layer may be disposed between the liquid crystal cell and one polarizing plate, or two optically anisotropic layers may be disposed between the liquid crystal cell and both polarizing plates. As the liquid crystal cell, liquid crystal cells of various driving methods such as a Twisted Nematic (TN) mode, a Vertically Aligned (VA) mode, an Optically Compensatory Bend (OCB) mode, and an In-Plane Switching (IPS) mode can be applied.

EXAMPLES

Hereinafter, the present invention is specifically described with reference to the examples. A material, a reagent, a substance quantity, a ratio thereof, an operation, and the like provided in the following examples can be suitably changed without departing from the gist of the present invention. Accordingly, the scope of the present invention is not limited to the following specific examples.

Example 1

(Preparation of Composition for Forming Hard Coat Layer)

Each component was added in the following composition, and the obtained composition was introduced to a mixing tank, stirred, and filtrated with a polypropylene filter having a pore size of 0.4 μm so as to obtain a hard coat layer coating solution.

(Hard Coat Layer Coating Solution HC-1)

| | |
|---|---|
| A-TMMT . . . | 33.6 parts by mass |
| IRGACURE 127 . . . | 1.4 parts by mass |
| Methyl ethyl ketone (MEK) . . . | 35.8 parts by mass |
| Methyl acetate . . . | 29.2 parts by mass |

(Hard Coat Layer Coating Solution HC-2)

| | |
|---|---|
| A-TMMT . . . | 24.1 parts by mass |
| AD-TMP . . . | 11.8 parts by mass |
| DPCA-60 . . . | 12.0 parts by mass |
| IRGACURE 127 . . . | 2.1 parts by mass |
| AS-1 . . . | 6.9 parts by mass |
| Ethanol . . . | 0.4 parts by mass |
| Ethanol . . . | 6.7 parts by mass |
| 1-Butanol . . . | 4.8 parts by mass |
| Methyl ethyl ketone (MEK) . . . | 16.8 parts by mass |
| Methyl acetate . . . | 14.4 parts by mass |
| FP-1 . . . | 0.05 parts by mass |

A-TMMT: Pentaervthritol tetraacrylate (manufactured by Shin Nakamura Chemical Co., Ltd.)

IRGACURE 127: Photopolymerization initiator (manufactured by BASF Japan Ltd.)

AD-TMP: Ditrimethylolpropane tetraacrylate (manufactured by Shin-Nakamura Chemical Co., Ltd., NK ESTER)

DPCA-60: Polyfunctional acrylate oligomer containing caprolactone structure (manufactured by Nippon Kayaku Co., Ltd., KAYARAD)

AS-1: A compound AS-1 corresponding the above patent document (A-6) was prepared in the same manner except that the reaction temperature and time of Synthesis Example 6 of JP4678451B were set as 70° C. and 6 hours. The completed compound AS-1 was a quaternary ammonium salt polymer having an ethylene oxide chain, and the weight-average molecular weight measured by GPC was about 60,000.

FP-1: Fluorine-containing compound represented by the following formula

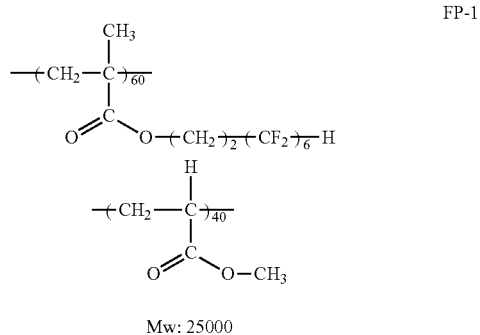

[Synthesis of Silica Particles P1]

67.54 kg of methyl alcohol and 26.33 kg of 28 mass % aqueous ammonia (water and catalyst) were introduced to a reactor with capacity of 200 L comprising a stirrer, a dropwise adding device, and a thermometer, and the liquid temperature was adjusted to 33° C. while stirring. On the other hand, a solution prepared by dissolving 12.70 kg of tetramethoxysilane in 5.59 kg of methyl alcohol was introduced to the dropwise adding device. While the liquid temperature in the reactor was maintained to 33° C., the above solution was added dropwise from the dropwise adding device over 44 minutes. After the dropwise addition was completed, stirring was continued while the liquid temperature was maintained to the above temperature for 44 minutes, and hydrolysis and condensation of tetramethoxy silane were performed, so as to obtain a dispersion liquid containing a silica particle precursor. This dispersion liquid was air-dried under the conditions of a heating tube temperature of 175° C. and a reduced pressure degree of 200 torr (27 kPa) by using an instantaneous vacuum evaporator (CRUX SYSTEM CVX-8B model manufactured by Hosokawa Micron Corporation), so as to obtain silica particles P1.

The average primary particle diameter of the silica particles P1 was 170 nm, the dispersion degree (CV value) of the particle diameter was 3.3%, and the indentation hardness was 340 MPa.

[Manufacturing of Calcined Silica Particles P2]

5 kg of the silica particles P1 were introduced to a crucible, calcined at 900° C. for two hours in an electric furnace, cooled, and then pulverized by using a pulverizer to obtain the calcined silica particles before classification. Disintegration and classification were performed by using a jet pulverizing classifier (IDS-2 model manufactured by Nippon Pneumatic Mfg. Co., Ltd.) to obtain calcined silica particles P2.

[Manufacturing of silane coupling agent-treated silica particles P3]5 kg of the calcined silica particles P2 were introduced to a Henschel mixer (FM20J model manufactured by Nippon Coke & Engineering Co., Ltd.) having a capacity of 20 L comprising a heating jacket. A solution obtained by dissolving 45 g of 3-acryloxvpropyltrimethoxysilane (KBM 5103 manufactured by Shin-Etsu Chemical Co., Ltd.) in 90 g of methyl alcohol was added dropwise to a portion in which the calcined silica particles P2 were stirred and mixed. Thereafter, the temperature was raised to 150° C. over about one hour while mixing and stirring, and the mixture was maintained at 150° C. for 12 hours, and the heat treatment was performed. Thereafter, in the heat treatment, the attachment on the wall was scraped off while the scraping device was rotated constantly in the opposite direction to the stirring blade. If necessary, the deposits on the wall were scraped off with a spatula. After heating, cooling was performed, and disintegration and classification were performed by using a jet pulverizing classifier, so as to obtain a silane coupling agent treated silica particles P3.

The average primary particle diameter of the silane coupling agent treated silica particles P3 was 171 nm, the dispersion degree (CV value) of the particle diameter was 3.3%, and the indentation hardness was 470 MPa.

[Manufacturing of Silica Particle Dispersion Liquid PA-1]

50 g of the silica particles P3 treated with a silane coupling agent, 200 g of MEK, and 600 g of zirconia beads having a diameter of 0.05 mm were introduced in a 1 L bottle having a diameter of 12 cm, set in a ball mill V-2M (IRIE SHOKAI Co., Ltd.), and dispersed for 10 hours at 250 rotation/min. In this manner, a silica particle dispersion liquid PA-1 (concentration of solid content: 20 mass %) was manufactured.

[Synthesis of Compound C3]

19.3 g of 3-isocyanatepropyltrimethoxy silane, 3.9 g of glycerin 1,3-bisacrylate, 6.8 g of 2-hydroxyethyl acrylate, 0.1 g of dibutyltin dilaurate, and 70.0 g of toluene were added to a flask equipped with a reflux condenser and a thermometer and were stirred at room temperature for 12 hours. After stirring, 500 ppm of methylhydroquinone was added, and distillation under reduced pressure was performed, so as to obtain compound C3.

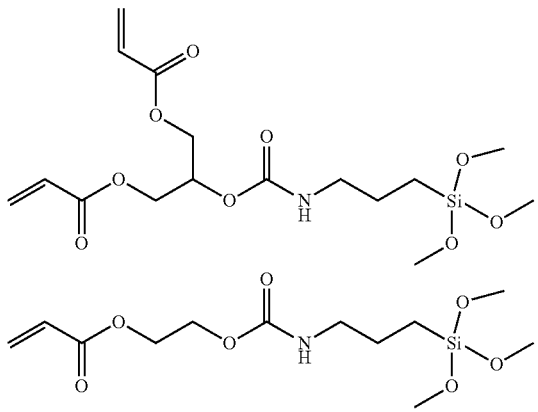

C3

[Preparation of Composition for Forming Layer (a)]

Each component was introduced to a mixing tank so as to have the composition, was stirred for 60 minutes, and was dispersed by an ultrasonic disperser for 30 minutes to obtain a coating solution.

Composition (A-1)

| | |
|---|---|
| U-15HA . . . | 1.4 parts by mass |
| Compound C3 . . . | 1.5 parts by mass |
| A-TMPT . . . | 1.7 parts by mass |
| Triethyl citrate . . . | 4.1 parts by mass |
| IRGACURE 127 . . . | 0.2 parts by mass |
| Compound P . . . | 0.1 parts by mass |
| FP-2 . . . | 0.1 parts by mass |
| Silica particle dispersion liquid PA-1 . . . | 32.3 parts by mass |
| Ethanol . . . | 12.7 parts by mass |
| Methyl ethyl ketone . . . | 33.2 parts by mass |
| Acetone . . . | 12.7 parts by mass |

Composition (A-2)

| | |
|---|---|
| U-15HA . . . | 1.4 parts by mass |
| Compound C3 . . . | 1.5 parts by mass |
| A-TMPT . . . | 1.7 parts by mass |
| Dimethyl suberate . . . | 4.1 parts by mass |
| IRGACURE 127 . . . | 0.2 parts by mass |
| Compound P . . . | 0.1 parts by mass |
| FP-2 . . . | 0.1 parts by mass |
| Silica particle dispersion liquid PA-1 . . . | 32.3 parts by mass |
| Ethanol . . . | 12.7 parts by mass |
| Methyl ethyl ketone . . . | 33.2 parts by mass |
| Acetone . . . | 12.7 parts by mass |

Composition (A-3)

| | |
|---|---|
| U-15HA . . . | 1.4 parts by mass |
| Compound C3 . . . | 1.5 parts by mass |
| A-TMPT . . . | 1.7 parts by mass |
| KBM-4803 . . . | 4.1 parts by mass |
| IRGACURE 127 . . . | 0.2 parts by mass |
| Compound P . . . | 0.1 parts by mass |
| FP-2 . . . | 0.1 parts by mass |

| Silica particle dispersion liquid PA-1 ... | 32.3 parts by mass |
|---|---|
| Ethanol ... | 12.7 parts by mass |
| Methyl ethyl ketone ... | 33.2 parts by mass |
| Acetone ... | 12.7 parts by mass |

U-15HA, a compound C3, and A-TMPT are the curable compound (a1).

The compounds used are provided below.

U-15HA (manufactured by Shin Nakamura Chemical Co., Ltd.): Urethane acrylate

A-TMPT: Polyfunctional acrylate (manufactured by Shin-Nakamura Chemical Co., Ltd.)

Triethyl citrate: Ester-based compound (manufactured by Tokyo Chemical Industry Co., Ltd.)

Dimethyl suberate: Ester-based compound (manufactured by Tokyo Chemical Industry Co., Ltd.)

KBM-4803: Silane coupling agent having a reactive group other than a radical reactive group (manufactured by Shin-Etsu Chemical Co., Ltd.)

IRGACURE 127: Photopolymerization initiator (manufactured by BASF Japan Ltd.)

Compound P: Photoacid generating agent represented by the following structural formula (manufactured by Fujifilm Wako Pure Chemical Corporation)

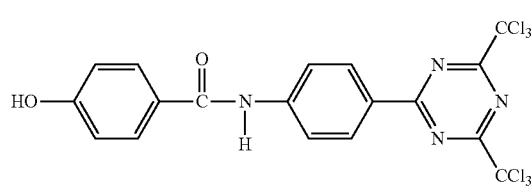

Compound P

FP-2: Fluorine-containing compound represented by the following formula

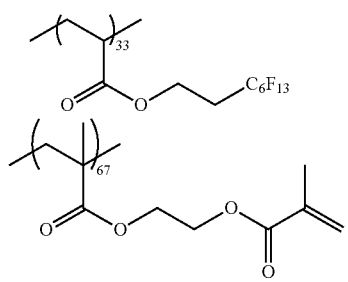

FP-2

Mw = 30000

<Preparation of Antireflection Film 1>

(Step (1): Coating of Layer (a))

A 100 μm polyethylene terephthalate film (FD 100M, manufactured by Fujifilm Corporation) as a temporary support was coated with the composition (A-1) by 2.8 ml/m$^2$ by using a die coater, and the composition was dried at 30° C. for 90 seconds.

(Step (2): Pre-Exposure of Layer (a))

While nitrogen purging was performed so as to be an atmosphere in which an oxygen concentration of 1.4 vol %, light irradiation was performed from the layer (a) side at an irradiation amount of 2.4 mJ/cm$^2$ and the illuminance of 0.60 mW by using a high-pressure mercury lamp (manufactured by Dr. Honle AG, model number: 33351N and Part no.: LAMP-HOZ 200 D24 U 450 E), so as to cure a part of the curable compound (a1) and to obtain the layer (ca). With respect to the measurement of the irradiation amount, HEAD SENSER PD-365 was mounted on an eye ultraviolet ray integrating accumulation light meter UV METER UVPF-A1 manufactured by Eye Graphics, Inc., and the measurement was performed in a measurement range of 0.00.

(Step (3): Bonding of Pressure Sensitive Film)

Subsequently, the pressure sensitive layer obtained by peeling off a release film from a protective film (MASTAC TFB AS3-304) manufactured by Fujimori Kogyo Co., Ltd. was bonded to the layer (a) such that the pressure sensitive adhesive layer (layer (b)) on the layer (a) side. The bonding was performed at a speed of 1 by using a commercial laminator Bio330 (manufactured by DAE-EL Co.)

The protective film herein refers to a laminate formed of the support/the pressure sensitive adhesive layer/the release film, and a laminate obtained by peeling off the release film from the protective film and formed of the support/the pressure sensitive adhesive layer was a pressure sensitive film.

The protective film used is as below.

MASTACK TFB AS3-304 (manufactured by Fujimori Kogyo Co., Ltd., Optical protective film with antistatic function) (hereinafter also referred to as "AS3-304")

Support: Polyester film (thickness: 38 μm)

Thickness of pressure sensitive adhesive layer: 20 μm

Maximum transmittance at wavelength of 250 nm to 300 nm in state in which release film was peeled: Less than 0.1%

The transmittance was measured using an ultraviolet-visible-near infrared spectrophotometer UV3150 manufactured by Shimadzu Corporation.

(Step (4): Permeation of Curable Compound (a1) into Layer (b))

After the pressure sensitive film was bonded, the layer (b) was left under the environment of 25° C. for five minutes such that a portion of the curable compound (a1) permeates the layer (b).

(Step (4-2): Partial Curing of Layer (Ca))

Subsequently, irradiation was performed with ultraviolet rays having an illuminance of 150 mW/cm$^2$ and an irradiation amount of 600 mJ/cm$^2$ from the opposite side of the support to the layer (ca) by using an air cooling metal halide lamp (manufactured by Eye Graphics Co., Ltd.) of 160 W/cm while purging was performed with nitrogen such that the atmosphere had an oxygen concentration of 0.01 vol % or less, so as to cure a portion of the layer (ca).

(Step (5): Manufacturing Peeling Laminate of Temporary Support)

FD100M which was the temporary support was peeled off from the laminate in the 180° direction at the speed of 30 m/min. The laminate 1 which is an example of the present invention was manufactured in this manner.

(Manufacturing Substrate with Hard Coat Layer)

—Forming of hard coat layer— The substrate (TJ25, manufactured by Fujifilm Corporation) was coated with the hard coat layer coating solution HC-1 by using a die coater at 17.3 ml/m$^2$. After drying was performed at 90° C. for one minute, while nitrogen purging is performed so as to have an atmosphere of an oxygen concentration of approximately 1.5 vol %, irradiation is performed with ultraviolet rays in an illuminance of 18 mW/cm$^2$ and an irradiation amount of 10 mJ/cm$^2$ by using an air cooling metal halide lamp (manufactured by Eye Graphics Co., Ltd.) of 160 W/cm so as to cure a coating layer, such that a hard coat layer having a thickness of 8 µm is formed. The substrate with a hard coat layer is set as HC-1.

(Step (6): Bonding of Substrate)

The hard coat layer side of the substrate HC-1 with a hard coat layer was bonded to the layer (ca) side of the laminate 1 from which the temporary support was removed in the step (5). The bonding was performed at a speed of 1 by using a commercial laminator Bio330 (manufactured by DAE-EL Co.)

(Step (7): Partial Curing of Layer (Ca))

Subsequently, irradiation was performed with ultraviolet rays having an illuminance of 150 mW/cm$^2$ and an irradiation amount of 600 mJ/cm$^2$ from the opposite side of the support to the layer (ca) by using an air cooling metal halide lamp (manufactured by Eye Graphics Co., Ltd.) of 160 W/cm while purging was performed with nitrogen such that the atmosphere had an oxygen concentration of 0.01 vol % or less, so as to cure a portion of the layer (ca).

(Step (8): Peeling of Pressure Sensitive Film)

A pressure sensitive film (film obtained by peeling off the release film from MASTACK TFB AS3-304) was peeled off from the prepared laminate.

(Step (9): Curing of Layer (Ca))

Subsequently, irradiation was performed with ultraviolet rays having an illuminance of 150 mW/cm$^2$ and an irradiation amount of 600 mJ/cm$^2$ from the opposite side the layer (ca) to the substrate of by using an air cooling metal halide lamp (manufactured by Eye Graphics Co., Ltd.) of 160 W/cm while purging was performed with nitrogen such that the atmosphere had an oxygen concentration of 0.01 vol % or less, so as to cure the layer (ca).

[Step (10): Washing]

Subsequently, methyl isobutyl ketone was applied to flow over the surface on which the pressure sensitive film was bonded so as to wash away a residue of the adhesive layer. Thereafter, the film was dried at 25° C. for 10 minutes to obtain an antireflection film 1.

Laminates 2 to 9 and antireflection films 2 to 9 were manufactured in the same manner as in the manufacturing of the laminate 1 and the antireflection film 1, except that the kind of the temporary support, the kind of the composition for forming the layer (a), the kind of the pressure sensitive film (protective film), the exposure amount of the pre-exposure in the step (2), the kind of the hard coat layer coating solution used, or the kind of the substrate were changed. In addition, as described above, the pressure sensitive film was a laminate which was obtained by peeling off the release film from the protective film and which consists of the support and the pressure sensitive adhesive layer. The types of protective film used are presented in Table 1.

Except for the above, the temporary support used was as below:

ZF14: 100 µm cycloolefin-based resin film (ZEONOR ZF-14, (manufactured by) Zeon Corporation)

Except for the above, the protective film used was as below:

MASTACK TFB AS3-310 (manufactured by Fujimori Kogyo Co., Ltd., Optical protective film with antistatic function) (hereinafter also referred to as "AS3-310")
Support: Polyester film (thickness: 38 µm)
Thickness of pressure sensitive adhesive layer: 15 µm
Maximum transmittance at wavelength of 250 nm to 300 nm in state in which release film was peeled: Less than 0.1%

Except for the above, the substrate used was as below.

HC-2: A substrate with a hard coat layer manufactured in the same manner in the manufacturing of the substrate HC-1 with a hard coat layer, except that a hard coat layer coating solution HC-2 was used instead of the hard coat layer coating solution HC-1.

FD100M: A 100 µm polyethylene terephthalate film (FD 100M, (manufactured by) Fujifilm Corporation)

(Method of Evaluating Antireflection Film)

Various properties of the antireflection film were evaluated by the following method. Results thereof are as presented in Table 1.

(Integrated Reflectivity)

In a state in which after the back side (substrate side) of the antireflection film was roughened with sandpaper, an oily black ink (magic ink for supplement: Teranishi Chemical Industry Co., Ltd.) was applied such that backside reflection was eliminated, an adapter ARV-474 was attached to a spectrophotometer V-550 (manufactured by JASCO Corporation), in the wavelength range of 380 to 780 nm, the integrated reflectivity at an incidence angle of 5° was measured, and the average reflectivity was calculated, so as to evaluate the antireflection performance.

(Total Haze)

The uniformity of the surface was evaluated by a haze value. The total haze value (%) of the obtained antireflection film was measured in accordance with JIS-K7136 (2000). A haze meter NDH4000 manufactured by Nippon Denshoku Industries Co., Ltd. was used in the device. In a case where particles aggregated and were not uniform, the haze increased, and thus a low haze is preferable.

(Transferability)

A black polyethylene terephthalate sheet with a pressure sensitive adhesive (manufactured by Tomoegawa Co., Ltd.: "clearly seen") was laminated on the opposite side to the transfer surface (surface having antireflection layer) of the antireflection film cut by the size of 30 cm×30 cm and was visually observed, so as to evaluate transferability according to the evaluation standard. A black polyethylene terephthalate sheet with a pressure sensitive adhesive was bonded to the antireflection film and was visually observed, a region (transferred region) in which reflectivity decreased more than in the substrate before the antireflection layer was transferred, and a region (non-transferred region) in which reflectivity increased to be equivalent to the original substrate were able to be visually checked. In a case where the transfer unevenness was generated, in the transferred region, the unevenness of the reflectivity was visually observed. The proportion of the transferred region was quantified by filling the non-transferred area with a white felt tip pen, capturing an image with a scanner, and obtaining the area.

(Evaluation Standard)

A: The ratio of the region capable of being transferred was 90% or more, and the transfer unevenness was not visually recognized.

B: The ratio of the region capable of being transferred was 90% or more, and the transfer unevenness was visually recognized.

C: The ratio of the region capable of being transferred was 80% or more and less than 90%.

D: The ratio of the region capable of being transferred was less than 80%.

The transferability is required to be A to C, in practice, and A and B are more preferable, and A is most preferable, since the reliability of the antireflection film produced by transfer is high.

[Method of Evaluating Laminate]

The various properties of the laminates 1 to 9 manufactured by the completion of the step (5) were evaluated. Results thereof are as presented in Table 1.

particles (a2) and the layer (ca) and the layer (b) was referred to as "not measurable. The determination on whether the interfacial peeling was performed or not was performed by observing the layer (b) after the peeling with SEM or AFM, and checking whether the particles were observed or not.

TABLE 1

|  | Laminate | Antireflection film | Temporary substrate | Step (1) Composition for forming layer (a) | Step (2) Ultraviolet irradiation amount [mJ/cm$^2$] | Step (3) Kind of protective film | Step (4-2) Ultraviolet irradiation amount [mJ/cm$^2$] | Kind of substrate |
|---|---|---|---|---|---|---|---|---|
| Example 1 | 1 | 1 | FD100M | A-1 | 2.4 | AS3-304 | 600 | HC-1 |
| Example 2 | 2 | 2 | FD100M | A-2 | 3.9 | AS3-304 | 600 | HC-1 |
| Example 3 | 3 | 3 | FD100M | A-3 | 5.2 | AS3-304 | 600 | HC-1 |
| Example 4 | 4 | 4 | ZF14 | A-1 | 2.4 | AS3-304 | 600 | HC-1 |
| Example 5 | 5 | 5 | FD100M | A-1 | 2.4 | AS3-304 | 600 | FD100M |
| Example 6 | 6 | 6 | FD100M | A-1 | 2.4 | AS3-304 | 600 | HC-2 |
| Example 7 | 7 | 7 | FD100M | A-1 | 2.4 | AS3-310 | 600 | HC-1 |
| Example 8 | 8 | 8 | FD100M | A-1 | 1.0 | AS3-304 | 600 | HC-1 |
| Comparative Example 1 | 9 | 9 | FD100M | A-1 | 0 | AS3-304 | 600 | HC-1 |

|  | Step (7) Ultraviolet irradiation amount [mJ/cm$^2$] | Step (9) Ultraviolet irradiation amount [mJ/cm$^2$] | Evaluation of transfer member | | | Properties of antireflection film | | |
|---|---|---|---|---|---|---|---|---|
|  |  |  | Δhaze [%] | Peeling force [N/25 mm] | Surface roughness of layer (ca) | Integrated reflectivity | Total haze [%] | Transferability |
| Example 1 | 600 | 600 | 0.0 | 8 | 1.5 | 0.6% | 1.3 | A |
| Example 2 | 600 | 600 | 0.2 | 12 | 1.2 | 0.9% | 1.5 | B |
| Example 3 | 600 | 600 | −0.1 | 8 | 1.4 | 0.6% | 1.1 | A |
| Example 4 | 600 | 600 | 0.5 | 16 | 1.5 | 1.0% | 2.0 | B |
| Example 5 | 600 | 600 | 0.0 | 8 | 1.5 | 0.8% | 1.5 | C |
| Example 6 | 600 | 600 | 0.0 | 8 | 1.5 | 0.6% | 1.3 | A |
| Example 7 | 600 | 600 | 0.0 | 10 | 2.0 | 0.7% | 1.4 | A |
| Example 8 | 600 | 600 | 0.9 | 25 | 0.5 | 1.6% | 2.4 | C |
| Comparative Example 1 | 600 | 600 | 1.7 | 38 | Not measurable | 3.0% | 3.4 | D |

(ΔHaze)

The hazes of the laminate obtained by the completion of the step (5) and the pressure sensitive film used were measured on the support side by incidence and were subtracted to obtain Δhaze. With respect to the measurement of the haze, each sample of 40 mm×80 mm can be measured according to JIS-K 7136 (2000) with a haze meter NDH 4000 manufactured by Nippon Denshoku Industries Co., Ltd. at 25° C. and a relative humidity of 60%.

(Surface Roughness)

In the laminate obtained the completion of the step (5), the surface roughness of the surface on the layer (ca) side was measured. As the surface roughness, a value calculated from the surface unevenness shape obtained by the measurement with SPA-400 (manufactured by Hitachi High-Tech Science Corporation) under measurement conditions of a measurement range 5 μm×5 μm, a measurement mode of DFM, and a measurement frequency of 2 Hz was used.

(Peeling Force)

A peeling force was measured in a case where the particles (a2) and the layer (ca) on the surface on an opposite side to the support of the transfer member (a laminate obtained by the completion of the step (5)) having a width of 25 mm were fixed to to the glass substrate having a thickness of 1.1 mm by using an adhesive, and the portion including the particles (a2) and the layer (ca) and the layer (b) were peeled off in the 90° direction and at the speed of 1,000 mm/min. Here, a case where peeling was not performed on the interface between the portion including the It was understood that the laminates 1 to 8 according to Examples 1 to 8 of the present invention had small Δhaze value, the small surface roughness, and an appropriate peeling force, so as to have satisfactory transferability. In contrast, with respect to the laminate of Comparative Example 1, since the exposure was not performed in the step (2), the particles (a2) were not regularly arranged, the Δhaze value and the surface roughness were increased, and thus the transferring to the substrate was not satisfactory.

It is understood that the antireflection films 1 to 8 obtained by the manufacturing method of the present invention by using the laminate of Examples 1 to 8 had low haze and satisfactory antireflection properties.

The laminate according to the embodiment of the present invention is a transfer member having satisfactory transferability and can be applied to a substrate for forming antireflection films having various forms.

EXPLANATION OF REFERENCES

1: temporary support
2: antireflection layer
3: particle (a2)
4: layer (a) or layer (ca)
5: support
6: layer (b)
7: pressure sensitive film
8: laminate 9: substrate
10: antireflection film
A: distance between peaks of adjacent protrusions
B: distance between the center of peaks of adjacent protrusions and recessed part

What is claimed is:

1. A method of manufacturing a laminate, comprising, in this order:
    a step (1) of providing particles (a2) having an average primary particle diameter of 100 nm to 380 nm and a curable compound (a1) on a temporary support in a thickness in which the particles (a2) are buried in a layer (a) including the curable compound (a1);
    a step (2) of curing a portion of the layer (a) to obtain a layer (ca);
    a step (3) of bonding a layer (b) of a pressure sensitive film having a support and the layer (b) including a pressure sensitive adhesive on the support, to the layer (ca);
    a step (4) of causing a position of an interface of the layer (ca) on a side of the support to come close to a side of the temporary support such that the particles (a2) are buried in a layer obtained by combining the layer (ca) and the layer (b) and protrude from the interface of the layer (ca) on the side of the support; and
    a step (5) of peeling the temporary support.

2. The method of manufacturing a laminate according to claim 1, further comprising:
    a step (4-2) of curing a portion of the layer (ca) in a state in which the particles (a2) are buried in the layer obtained by combining the layer (ca) and the layer (b) between the step (4) and the step (5).

3. The method of manufacturing a laminate according to claim 2,
    wherein, in the step (2), the portion of the layer (a) is cured by irradiation with ultraviolet rays at an irradiation amount of 1 to 90 ml/cm$^2$, to obtain the layer (ca).

4. The method of manufacturing a laminate according to claim 1,
    wherein, in the step (2), the portion of the layer (a) is cured by irradiation with ultraviolet rays at an irradiation amount of 1 to 90 mJ/cm$^2$, to obtain the layer (ca).

5. A method of manufacturing an antireflection film, comprising, in this order:
    manufacturing the laminate according to claim 1;
    a step (6) of bonding the layer (ca) to a substrate;
    a step (7) of curing the layer (ca) in a state in which the particles (a2) are buried in the layer obtained by combining the layer (ca) and the layer (b); and
    a step (8) of peeling the pressure sensitive film.

* * * * *